US012769263B2

(12) United States Patent
Romeres et al.

(10) Patent No.: US 12,769,263 B2
(45) Date of Patent: Oct. 20, 2026

(54) SYSTEMS AND METHODS FOR CONTROLLING AN UNDERACTUATED MECHANICAL SYSTEM WITH MULTIPLE DEGREES OF FREEDOM

(71) Applicant: Mitsubishi Electric Research Laboratories, Inc., Cambridge, MA (US)

(72) Inventors: Diego Romeres, Boston, MA (US); Giulio Giacomuzzo, Padua (IT); Ruggero Carli, Padua (IT); Alberto Dalla Libera, Padua (IT)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 269 days.

(21) Appl. No.: 18/772,131

(22) Filed: Jul. 13, 2024

(65) Prior Publication Data

US 2024/0393751 A1 Nov. 28, 2024

Related U.S. Application Data

(63) Continuation-in-part of application No. 18/222,540, filed on Jul. 17, 2023, now Pat. No. 12,629,823.

(60) Provisional application No. 63/469,002, filed on May 25, 2023.

(51) Int. Cl.
*G05B 13/02* (2006.01)

(52) U.S. Cl.
CPC ................................ *G05B 13/0265* (2013.01)

(58) Field of Classification Search
CPC ................................................. G05B 13/0265
See application file for complete search history.

(56) References Cited

U.S. PATENT DOCUMENTS

2004/0249319 A1 * 12/2004 Dariush .................. A61H 3/00 600/595
2020/0171657 A1 * 6/2020 Baier .................... B25J 9/1664

OTHER PUBLICATIONS

Giulio Giacomuzzo, "Advantages of a physics-embedding kernel for robot inverse dynamics identification", Jul. 1, 2022, 2022 30th Mediterranean Conference on Control and Automation (MED), IEEE (Year: 2022).*

Diego Romeres, "Online semi-parametric learning for inverse dynamics modeling", Dec. 14, 2016, IEEE 55th Conference on Decision and Control (CDC) (Year: 2016).*

(Continued)

*Primary Examiner* — Christopher W Carter
(74) *Attorney, Agent, or Firm* — Gene Vinokur

(57) ABSTRACT

A method for controlling a mechanical system utilizes an energy-based inverse dynamics model trained to map dynamic states of the mechanical system to corresponding torques for a plurality of actuators of the mechanical system. The method comprises collecting a feedback signal including current states of dynamics of the mechanical system. The method further comprises processing the current states of dynamics with the energy-based inverse dynamics model to produce values of the torques for the plurality of actuators and values of the potential and kinetic energy of the mechanical system. The method further comprises controlling the mechanical system based on the produced values of the torques for the plurality of actuators of the mechanical system and the values of the potential and kinetic energy of the mechanical system.

18 Claims, 12 Drawing Sheets

(56) References Cited

OTHER PUBLICATIONS

Diego Romeres, "Feedback Linearization Robot Control based on Gaussian Process Inverse Dynamics Model", Dec. 16, 2020, Mitsubishi Electric Research Laboratories, Conferenza Italiana di Robotica e Macchine Intelligenti (Year: 2020).*

Lutter, Michael, Christian Ritter, and Jan Peters. Deep Lagrangian Networks: Using Physics as Model Prior for Deep Learning, ICLR 2019.

Mark W Spong and Laurent Praly. Control of underactuated mechanical systems using switching and saturation. In Control using logic-based switching, pp. 162-172. Springer, 2005.

Giulio Giacomuzzo, Alberto Dalla Libera, Diego Romeres, and Ruggero Carli. A black-box physics-informed estimator based on gaussian process regression for robot inverse dynamics identification. arXiv preprint arXiv:2310.06585, 2023.

* cited by examiner

SYSTEMS AND METHODS FOR CONTROLLING AN UNDERACTUATED MECHANICAL SYSTEM WITH MULTIPLE DEGREES OF FREEDOM

CROSS REFERENCE TO RELATED APPLICATIONS

This application is a continuation-in-part of U.S. patent application Ser. No. 18/222,540 filed Jul. 17, 2023, which claims benefit of priority from provisional application Ser. No. 63/469,002 filed May 25, 2023, the contents of which are incorporated by reference herein.

TECHNICAL FIELD

The present disclosure relates generally to control systems for mechanical manipulators, and more particularly to a system and a method for controlling an underactuated mechanical system having multiple degrees of freedom and different kinds of actuators.

BACKGROUND

A mechanical system, e.g., a robotic manipulator, is configured to track a reference trajectory for performing a task. The task, for example, corresponds to moving an object to a target position, or an assembly operation. To control the mechanical system to track the reference trajectory, a model of dynamics of the mechanical system is utilized. The model of dynamics is a mathematical model that includes equations which define dynamics of the mechanical system. Some approaches use a model of inverse dynamics of the mechanical system to control the mechanical system as the model of inverse dynamics enables controlling of the mechanical system. The model of inverse dynamics expresses joint torques as a function of joint positions, velocities and accelerations. It is desired to formulate an accurate model of the inverse dynamics for controlling the mechanical system.

Under-actuated robots (UR) are an important class of mechanical systems. UR are mechanical systems characterized by fewer control inputs than degrees of freedom (DOF). Such systems are ubiquitous in robotics: examples are manipulators with passive joints, autonomous bicycles and motorcycles, bipedal robots, and most of the aerospace and marine vehicles. For instance, several Reinforcement Learning algorithms have been applied to the UR control problem. These algorithms aim at automatically learning a control law. However, such methods typically require a huge amount of interactions with the system and do not provide any performance guarantees. Even control strategies which combine model learning with classic model-based control methods rely on the inverse dynamics model, which relates torques to the robot trajectories. However, learning the inverse dynamics model is a challenging and to a great extent unexplored task for control of UR systems.

SUMMARY

Some example embodiments are based on the realization that for effective control of mechanical systems such as robots, an accurate model of the dynamics of such a mechanical system is required. The model of dynamics is a mathematical model including equations which define dynamics of the mechanical system. The model of dynamics may be a model of forward dynamics that connects control commands and current states of the different actuators to transitioned states of the different actuators achieved by executing the control commands. Alternately, the model of dynamics may be a model of inverse dynamics that maps the current states and the transitioned states of the different actuators to corresponding torques for the different actuators. For efficient control of such systems, one approach is to use the model of inverse dynamics of the mechanical system since the model of inverse dynamics enables controlling of the mechanical system. The model of inverse dynamics expresses joint torques as a function of joint positions, velocities and accelerations. It is an object of some embodiments to control a mechanical system using a model of inverse dynamics. In this regard, it is also an objective of some embodiments to derive an accurate inverse dynamics model of the mechanical system. The mechanical system may be a robotic system having different actuators and multiple degrees of freedom to track a reference trajectory for performing a task. For example, the robotic system may be a manipulator configured to track the reference trajectory for performing a task of moving an object to a target location. The robotic manipulator includes joints and links. Each joint is actuated by an actuator such as an electric motor. A motion given by the actuator makes the link attached to the joint move.

Generally, an accurate physical model of the inverse dynamics of such mechanical systems is difficult and time-consuming to generate. Conventional model-based approaches which derive parametric models directly from first principles of physics are often limited in performance by both the presence of parametric uncertainty and the inability to describe certain complex dynamics typical of real systems, such as motor friction or joint elasticity. Accordingly, it is advantageous to utilize machine learning-based approaches for deriving inverse dynamics models of such systems. Some machine learning-based approaches in this regard are mainly based on deep neural networks (NN) and Gaussian Process Regression (GPR). Some embodiments realized that in this context, both gray-box and black-box approaches may be suitable. Within gray-box techniques, a model-based component encoding the known dynamics may be combined with a data-driven one, which can compensate for modeling errors and unknown dynamical effects.

However, it is a realization of some embodiments that the performance of these methods strongly depends on the effectiveness of the model-based component, so they still require to derive sufficiently accurate physical models, which might be particularly time-consuming and complex if some parameters are unknown or not known precisely. In contrast, pure black-box methods learn inverse dynamics models directly from experimental data, without requiring deep knowledge of the underlying physical system. Despite their ability to approximate even complex non-linear dynamics, pure black-box methods typically suffer from low data efficiency and poor generalization properties: learned models require a large amount of samples to be trained and extrapolate only within a neighborhood of the training trajectories.

Some embodiments realized that to overcome the aforementioned limitations of black-box techniques in the context of NN and for the GPR framework, a promising class of solutions is represented by Physics Informed Learning (PIL), which proposes to embed insights from physics as a prior in black-box models. Instead of learning the inverse dynamics in an unstructured manner, which makes the problem unnecessarily complex, some embodiments embed physical properties in the model to improve generalization and data efficiency. Accordingly, some embodiments provide a PIL model for inverse dynamics identification of mechanical systems based on GPR. A standard approach for applying GPR to the inverse dynamics identification involves modeling each joint torque directly with a distinct Gaussian Process (GP), assuming the GPs independent of one another given the current joint position, velocity, and acceleration. However, some embodiments realized that such single-output approaches ignore the correlations between the different joint torques imposed by the Lagrangian equations, which in turn limits generalization and data efficiency.

Inspired from these realizations, some embodiments provide a multi-output GPR estimator based on a novel kernel function referred to as a Lagrangian Inspired Polynomial kernel (LIP), which exploits Lagrangian mechanics to model the correlations between the different joint torques, instead of modelling each joint torque with a distinct Gaussian Process (GP), assuming the GPs independent of one another given the current joint position, velocity, and acceleration. Some embodiments exploit the fact that the dynamics equations are linear with respect to the Lagrangian, to obtain the Gaussian Processes (GPS) of the torques by applying a set of linear operators to the GPs of the potential and kinetic energy of the mechanical system. Some embodiments recognize that the kinetic and potential energy are polynomial functions in a suitable input space and derive a polynomial kernel that encodes this property.

Accordingly, some example embodiments derive the LIP estimator as a black-box multi-output GPR model which encodes the symmetries typical of Lagrangian systems. The LIP model estimates the kinetic and potential energy in a principled way, allowing its integration with energy-based control strategies. Since the LIP estimator encodes physical properties in the model, the LIP estimator outperforms state-of-the-art black-box GP estimators as well as NN-based solutions, obtaining better data efficiency and generalization performance.

Some embodiments are also based on the realization that training the model of inverse dynamics is difficult because of lack of structure of the model of inverse dynamics, which fail to describe physical principles that govern dynamics of the multiple degrees of freedom of the mechanical system. For example, the robotic manipulator may have joints that define the multiple degrees of freedom, and dynamics of the joints are correlated to each other. Therefore, there exists a complex and potentially non-linear correlation between torques for the joints needed to track the reference trajectory. Such a correlation is challenging to learn through training. Also, for some special types of mechanical systems such as underactuated robots which have fewer actuators than degrees of freedom, learning inverse dynamics models for the control of such robots is particularly challenging because under actuation further exacerbates the aforementioned problems. For example, torques of the underactuated dimensions are constant signals equal to zero, leading to an ill-posed estimation problem.

Towards this end, some embodiments are directed towards physics-informed model-based solutions for controlling such systems. Some embodiments are based on the recognition that Gaussian Processes Regression (GPR) can be used to learn the correlation between torques of the joints. For example, several Gaussian processes-based solutions use GPR to model n torque components; one for each degree of freedom with n independent Gaussian Process (GP) and include a model-based component on a mean function or a covariance. As a result, a covariance matrix for such a GPR model is either diagonal or block diagonal to represent that the correlation between torques of the different actuators is not captured.

Some embodiments are based on the realization that such a deficiency is caused, at least in part, by an attempt to model the torque itself as a Gaussian process. However, some embodiments are based on the realization that the Gaussian process can be designed to model kinetic and potential energy of the mechanical system. In contrast with modeling individual torques, modeling the energy captures mutual effects of the torques of the different actuators on each other, which in turn allows to learn the correlation among the torques of the different actuators. As a result, the covariance matrix capturing correlations between the torques of the different actuators is a full matrix with non-zero elements inside and outside of the diagonal.

Towards this end, some embodiments provide an inverse dynamics model that models energy of the mechanical system with a GPR having a full prior and posterior covariance matrix that captures the correlations between the torques of the different actuators. The inverse dynamics model is trained with machine learning to map the dynamic states of the different actuators and joints to corresponding torques for the different actuators. According to an embodiment, dynamic states of the different actuators and joints are processed with the inverse dynamics model to produce values of the torques for the different actuators of the mechanical system and estimate values of the potential and kinetic energy of the mechanical system. Further, the mechanical system is controlled based on the values of the torques and the values of the potential and kinetic energy of the mechanical system. For instance, control commands are determined based on the values of the torques for the different actuators and the values of the potential and kinetic energy of the mechanical system. Further, the determined control commands are applied to the different actuators to control the mechanical system.

Some example embodiments are directed towards model and control of underactuated robots with energy-based techniques. In this regard, some example embodiments provide techniques for modelling and synthesis of energy-based controllers and control methods for UR systems. Some embodiments provide a Lagrangian Inspired Polynomial (LIP) estimator as a black-box estimator based on Gaussian Process Regression. The LIP estimator relies on a multidimensional, multi-output kernel that embeds the structure of the Euler-Lagrange equation. According to some embodiments, the LIP estimator learns various components of the inverse dynamics map, as well as the kinetic and potential energies of the UR system. Some embodiments utilize the LIP estimator to estimate values of kinetic and potential energies of the UR system, as well as the inertial, Coriolis, and gravity components directly from the overall torque measures. Some embodiments further utilize these properties to derive an energy-based controller for the stabilization and control of complex robots such as UR. The energy-based controller performs a partial feedback linearization on the actuated system and a regulation of the energy to steer the non-actuated system to a trajectory passing through the unstable equilibrium. Once the system is sufficiently close to the target, the control is switched to a Linear Quadratic Regulator (LQR) controller. The LIP model is suitable to implement this kind of controller since it returns the inertia matrix, the Coriolis and gravity torques, energy estimates, and the linearization of the system dynamics required by the LQR.

In order to realize the aforementioned objectives and advantages, various embodiments of this disclosure provide feedback controllers, feedback control methods and systems for controlling a mechanical system such as an underactuated robot in accordance with an inverse dynamics model of the system that is learned through machine learning techniques involving GPR.

According to some embodiments, a feedback controller for controlling a mechanical system to perform a task or to track a reference trajectory for performing a task is provided. The mechanical system has multiple degrees of freedom and comprises a plurality of actuators. The feedback controller comprises a memory configured to store an energy-based inverse dynamics model and computer program instructions and a processor configured to execute the instructions for controlling the mechanical system. The energy-based inverse dynamics model is trained with machine learning to map dynamic states of the mechanical system to corresponding torques for the plurality of actuators. In this regard, the energy-based inverse dynamics model is configured to model potential and kinetic energy of the mechanical system as Gaussian Processes of the dynamic states and derive Gaussian Processes for the torques from the Gaussian Processes of the dynamic states of the mechanical system based on physics of relationship between the torques and the potential and kinetic energy of the mechanical system. The processor executes the instructions to collect a feedback signal of an operation of the mechanical system, the feedback signal including current states of dynamics of the mechanical system indicative of a position, a velocity, and an acceleration of each joint of the plurality of joints of the mechanical system. The processor is further configured to process the current states of dynamics with the energy-based inverse dynamics model to produce values of the torques for the plurality of actuators and values of the potential and kinetic energy of the mechanical system. The processor controls the mechanical system based on the produced values of the torques for the plurality of actuators of the mechanical system and the values of the potential and kinetic energy of the mechanical system.

According to some other embodiments, a method for controlling a mechanical system to track a reference trajectory for performing a task is provided. The mechanical system has multiple degrees of freedom and comprises a plurality of actuators. The method utilizes an energy-based inverse dynamics model trained with machine learning to map dynamic states of the mechanical system to corresponding torques for the plurality of actuators. In this regard, the energy-based inverse dynamics model is configured to model potential and kinetic energy of the mechanical system as Gaussian Processes of the dynamic states and derive Gaussian Processes for the torques from the Gaussian Processes of the dynamic states of the mechanical system based on physics of relationship between the torques and the potential and kinetic energy of the mechanical system. The method comprises collecting a feedback signal of an operation of the mechanical system, the feedback signal including current states of dynamics of the mechanical system indicative of a position, a velocity, and an acceleration of each joint of the plurality of joints of the mechanical system. The method further comprises processing the current states of dynamics with the energy-based inverse dynamics model to produce values of the torques for the plurality of actuators and values of the potential and kinetic energy of the mechanical system. The method further comprises controlling the mechanical system based on the produced values of the torques for the plurality of actuators of the mechanical system and the values of the potential and kinetic energy of the mechanical system.

BRIEF DESCRIPTION OF THE DRAWINGS

The presently disclosed embodiments will be further explained with reference to the following drawings. The drawings shown are not necessarily to scale, with emphasis instead generally being placed upon illustrating the principles of the presently disclosed embodiments.

Figure 1A:
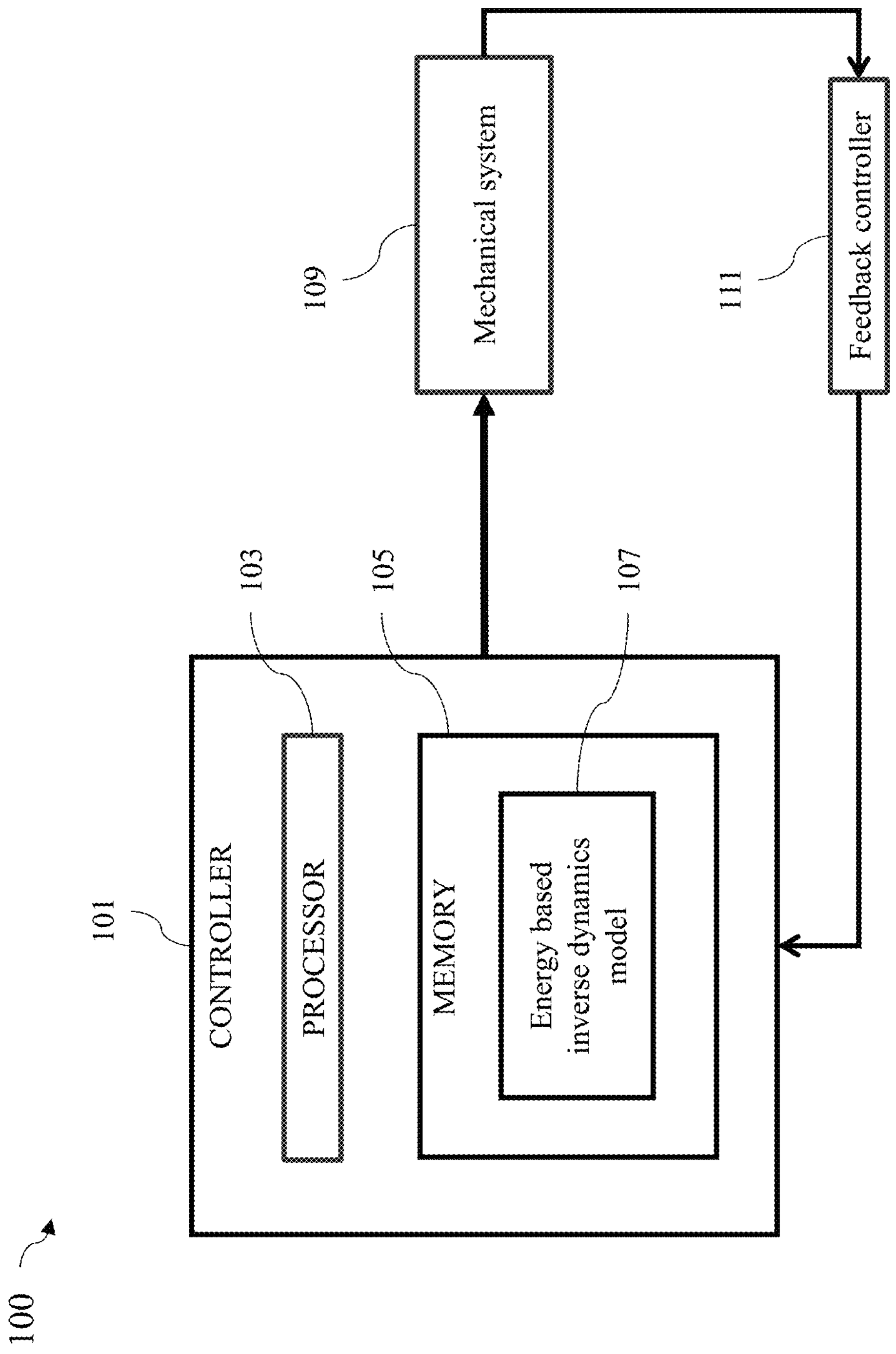
FIG. 1A illustrates a block diagram of a controller for controlling a mechanical system, according to some embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like-reference numbers and designations in the various drawings may indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

FIG. 1A illustrates a block diagram 100 of a controller 101 for controlling a mechanical system 109, according to some embodiments of the present disclosure. The controller 101 is communicatively coupled to the mechanical system 109. The controller 101 includes a processor 103 and a memory 105. The processor 103 may be a single core processor, a multi-core processor, a computing cluster, or any number of other configurations. The memory 105 may include random access memory (RAM), read only memory (ROM), flash memory, or any other suitable memory systems. Additionally, in some embodiments, the memory 105 may be implemented using a hard drive, an optical drive, a thumb drive, an array of drives, or any combinations thereof.

According to some embodiments, the controller 101 controls the mechanical system 109 to track a reference trajectory for performing a task. The mechanical system 109 has multiple degrees of freedom (DoF) and comprises a plurality of joints that can are movable. In this regard, the mechanical system 109 comprises a plurality of actuators and one or more joints of the system 109 are movable by one or more of the actuators. According to some embodiments, the mechanical system 109 may be an underactuated system such as an underactuated robot where at least one joint of the underactuated system is not directly movable by any actuator. "Underactuated" in the present disclosure may correspond to a jointed mechanism in which not all of the joints of the mechanism are actuated, i.e., some of the joints are passive or unactuated. An under-actuated robot means a robot whose number of degrees of freedom of motion, which can be directly controlled by the mounted actuator, is less than the degree of freedom of motion of the robot. According to some embodiments, the mechanical system 109 may have all joints directly movable by at least one actuator. However, in some special applications, the mechanical system 109 may be converted into an underactuated system. For example, when at least one actuator associated with at least one joint does not move the corresponding joint, the system 109 may operate as an underactuated system. Such scenarios may arise when one or more actuators are deliberately not fired but the corresponding joint is intended to be moved for performing a task. Alternately or additionally, such scenarios may also arise when one or more actuators malfunction due to operational reasons or due to breakdown in the underlying control system or communication system of such an actuator.

The controller 101 may also be coupled to suitable interfaces to collect a feedback signal for an operation of the mechanical system 109. The feedback signal may include current state of dynamics of the mechanical system 109. The current state of dynamics of the system 109 may be indicative of a position, a velocity, and an acceleration of each joint of the plurality of joints of the mechanical system 109. In this regard, the controller 101 may interface with suitable sensing circuitry that provides measures of the current state of dynamics of the system 109. In some embodiments, the controller 101 may compute the current state of dynamics of the system 109 from one or more observations pertaining to the operation of the mechanical system 109.

The energy based inverse dynamics model 107 defines a mathematical model of the inverse dynamics of the mechanical system 109. The model 107 maps the current states and the transitioned states of the different actuators to corresponding torques for the different actuators. The model 107 expresses joint torques as a function of joint positions, velocities and accelerations. Some embodiments utilize machine learning-based approaches for deriving the energy-based inverse dynamics model 107 of the system 109. The model 107 embeds physical properties between torques of the actuators in the model to improve generalization and data efficiency. In this regard, some embodiments provide the model 107 as a physics-informed-learned model for inverse dynamics identification of the mechanical system 109 based on Gaussian Process Regression (GPR). To model the correlations between the different joint torques, some embodiments realize the energy based inverse dynamics model 107 as a multi-output GPR estimator based on a novel kernel function referred to as a Lagrangian Inspired Polynomial kernel (LIP) which exploits Lagrangian mechanics to model the correlations between the different joint torques, in addition to modelling each joint torque with a distinct Gaussian Process (GP), assuming the GPs independent of one another given the current joint position, velocity, and acceleration. Details of the structure and training of the model 107 are described later in the disclosure.

The controller 101 processes the feedback signal to produce values of torques for the different actuators of the system 107. In some embodiments, the produced values of the torques may be translated into control commands specifying values of currents, voltages or other physical parameters of the actuators. The control commands may be applied to the different actuators. The control commands cause the different actuators to change their states to track the reference trajectory. The changed states of the different actuators may be input to a feedback controller 111. Based on the changed states of the different actuators, the feedback controller 111 provides a correction to the values of the torques to compensate for errors in the positions and the velocities of the joints to accurately track the reference trajectory.

Figure 1B:
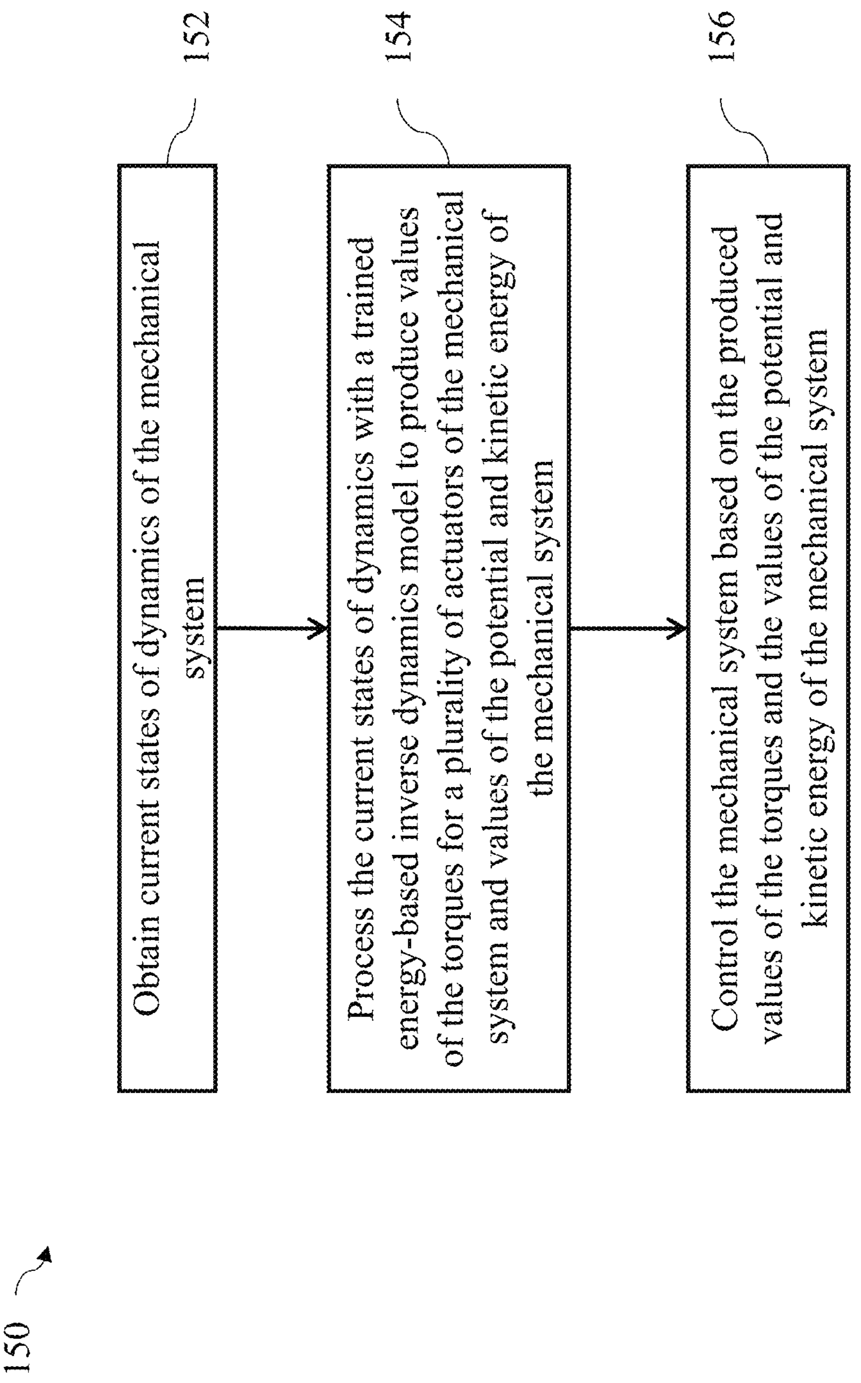
FIG. 1B illustrates a method for controlling the mechanical system of FIG. 1A, according to some embodiments.

FIG. 1B illustrates a method 150 for controlling the mechanical system 109 of FIG. 1A by the controller 101, according to some embodiments. FIG. 1B will be described with reference to FIG. 1A. The current states of the dynamics of the mechanical system are obtained 152 by the controller 101. The current state of dynamics of the system 109 may be indicative of a position, a velocity, and an acceleration of each joint of the plurality of joints of the mechanical system 109. The current state of the dynamics of the system 109 is processed 154 with the trained energy-based inverse dynamics model 107. For example, the states of the different actuators and/or joints may be applied as input to the inverse dynamics model 107 to produce values of the torques for the actuators of the mechanical system 109 and values of the potential and kinetic energy of the mechanical system 109. Towards this end, the energy-based inverse dynamics model 107 may be trained with machine learning to map dynamic states of the mechanical system 109 to corresponding torques for the plurality of actuators. Thus, the energy-based inverse dynamics model 107 models the potential and kinetic energy of the mechanical system 109 as Gaussian Processes of the dynamic states. The model 107 derives Gaussian Processes for the torques from the Gaussian Processes of the dynamic states of the mechanical system 109 based on physics of relationship between the torques and the potential and kinetic energy of the mechanical system 109.

Using the values of the torques and the values of the kinetic energy and potential energy of the system 109, control commands may be generated to control 156 the mechanical system 109. For example, the determined control commands may be applied to the different actuators. The control commands cause the different actuators to change their states to track the reference trajectory. The changed states of the different actuators may be input to the feedback controller 111. Based on the changed states of the different actuators, the feedback controller 111 may be configured to provide a correction to the values of the torques to compensate for errors in the positions and the velocities of the joints to accurately track the reference trajectory.

Figure 2A:
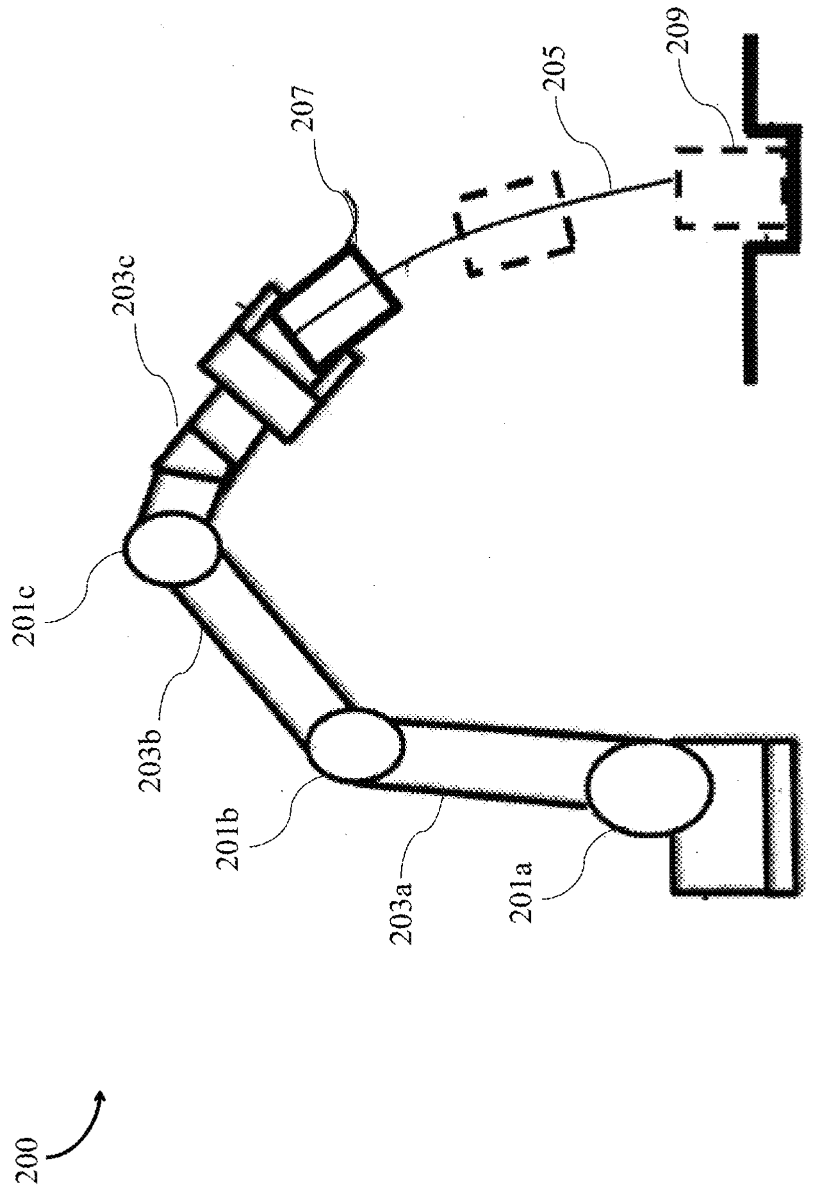
FIG. 2A illustrates a robotic manipulator, according to some embodiments.

In an embodiment, the mechanical system 109 corresponds to a robotic manipulator having different actuators and multiple degrees of freedom to track a reference trajectory for performing a task. An example robotic manipulator is described next with reference to FIG. 2A. For example, the robotic manipulator 200 is configured to track a reference trajectory 205 for performing a task of moving an object 207 to a target location 209. In another example, the robotic manipulator 200 is configured to track a reference trajectory for performing an assembly operation. The robotic manipulator 200 includes joints such as joints 201*a*, 201*b*, and 201*c*. The robotic manipulator 200 further includes links, such as a link 203*a*, a link 203*b*, and a link 203*c*. Each joint is actuated by an actuator such as an electric motor. An action given by the actuator makes the link attached to the joint move. The movement can be rotational or translational according to a type of the joint. The type of the joint may be a revolute joint or a prismatic joint. The actuator takes as input a desired position of the joint and outputs an action that can be current, torque or a quantity that can be transformed to torque which causes the joint to move to the desired position.

Further, the different actuators are equipped with position sensors (such as encoders) that can measure current positions of the joints. In some embodiments, states of the different actuators are defined as positions of the joints. In some other embodiments, the states of the different actuators are defined as a combination of the positions of the joints, velocities of the joints, and/or accelerations of the joints.

According to some alternate embodiments, the manipulator 200 may be an underactuated manipulator where at least one joint of the manipulator 200 is only indirectly movable by the actuators of the manipulator. Such a joint may be referred to as an unactuated joint. For example, the unactuated joint may not be associated with a corresponding actuator(s). Alternately, the unactuated joint may have a corresponding actuator that has malfunctioned due to operational reasons. The absence of an actuator for one or more joints or presence of an unactuated joint in the robotic manipulator operationally makes it an underactuated mechanical system that is characterized by fewer control inputs than degrees of freedom. Such systems are ubiquitous in robotics: examples are manipulators with passive joints, autonomous bicycles and motorcycles, bipedal robots, and most of the aerospace and marine vehicles.

For such underactuated robotic systems, learning inverse dynamics models for the control of such robots is particularly challenging. For example, torques of the underactuated dimensions are constant signals equal to zero, leading to an ill-posed estimation problem. It is a realization of several embodiments that Gaussian Processes Regression (GPR) may be used to learn the correlation between torques of the joints. In this regard, some embodiments realize that the Gaussian process can be designed to model energy of the mechanical system. In contrast with modeling individual torques, modeling the energy captures mutual effects of the torques of the different actuators on each other, which in turn allows to learn the correlation among the torques of the different actuators. As a result, the covariance matrix capturing correlations between the torques of the different actuators is a full matrix with non-zero elements inside and outside of the diagonal.

Figure 2B:
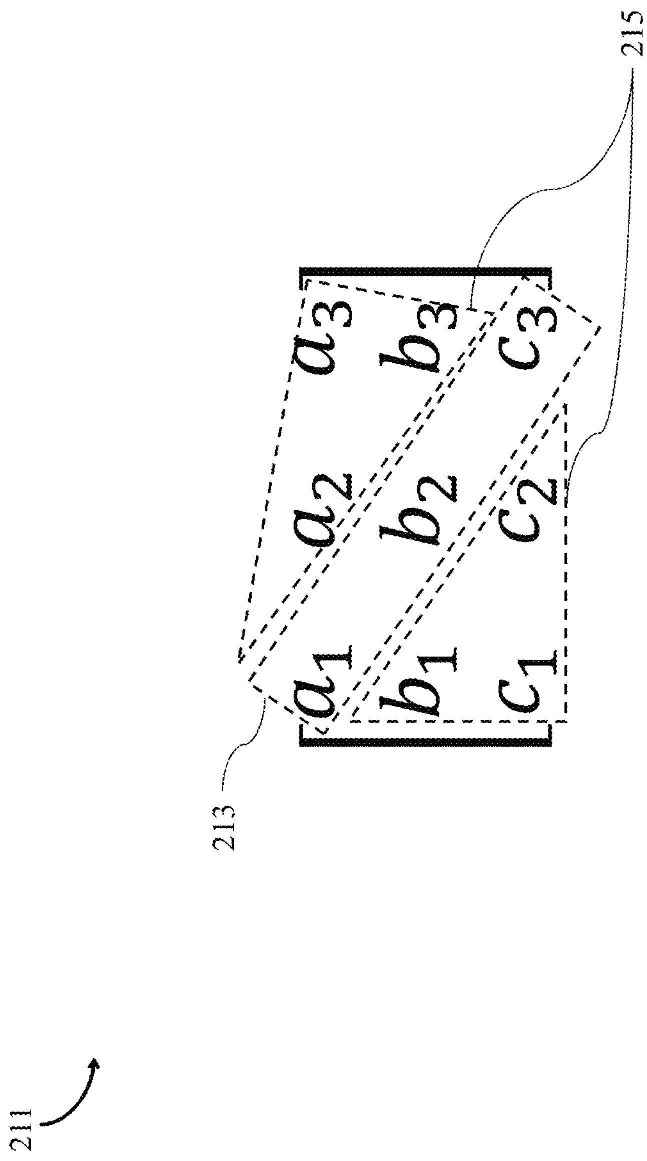
FIG. 2B illustrates one example of a full covariance matrix for an underactuated mechanical system, according to some embodiments.

FIG. 2B illustrates one example of a full covariance matrix 211, according to some embodiments of the present disclosure. Diagonal elements 213, i.e., $a_1$, $b_2$, and $c_3$, and non-diagonal elements 215, i.e., $a_2$, $a_3$, $b_1$, $b_3$, $c_1$, and $c_2$, of the full covariance matrix 211 are non-zero elements. Since the elements of the full covariance matrix 211 are non-zero elements, the full covariance matrix 211 captures the correlations between the torques of the different actuators.

Figure 3:
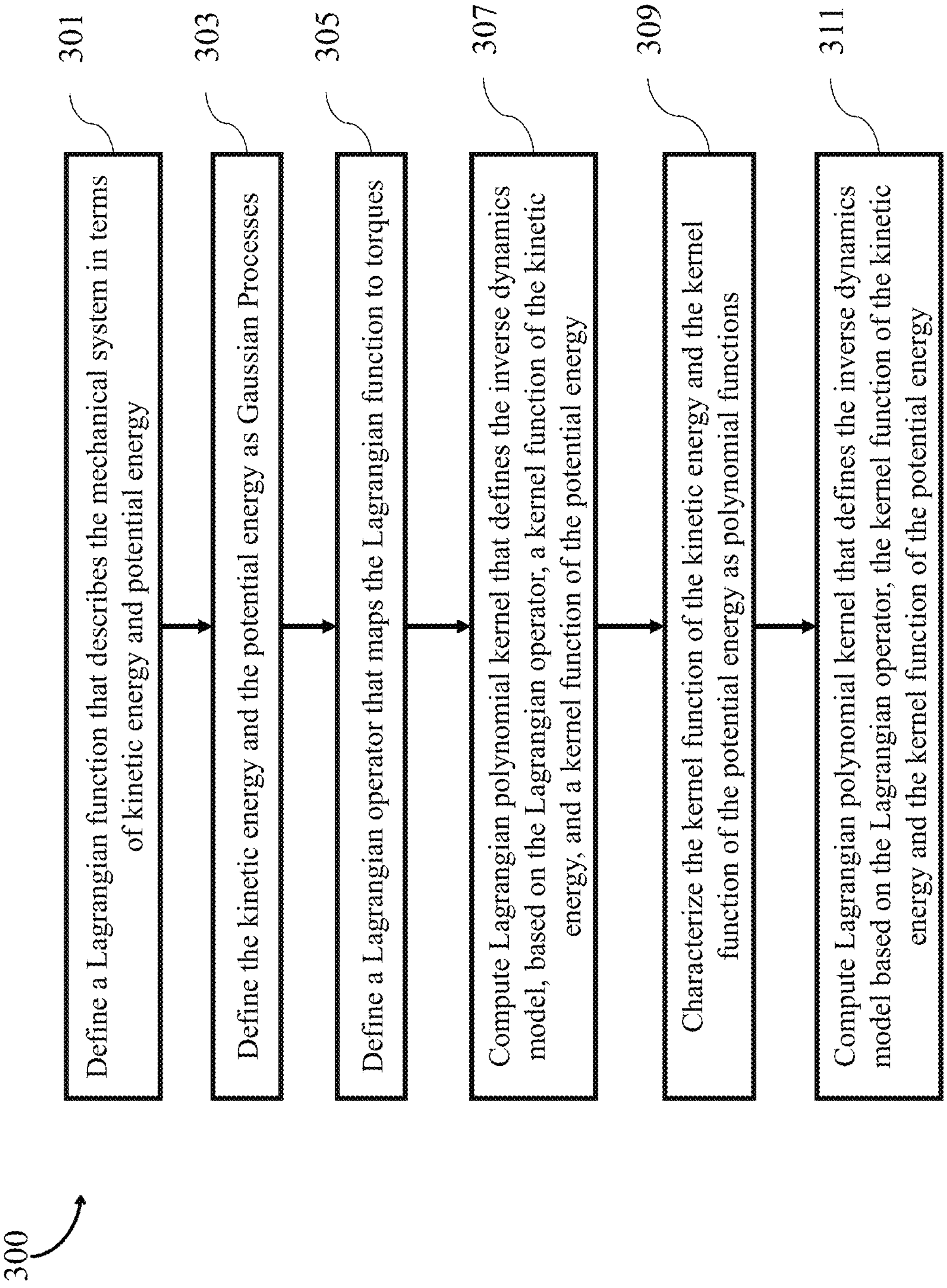
FIG. 3 illustrates a block diagram of a method for formulating an inverse dynamics model, according to some embodiments.

FIG. 3 illustrates a flow diagram of a method 300 for formulating the energy-based inverse dynamics model 107 of FIG. 1A, according to some embodiments. In general, GPR can use different types of kernels to learn the inverse dynamics of the mechanical system 109 by modeling its energy. Some embodiments use physics informed energy kernels that define the energy of the mechanical system 109. The energy kernels increase an accuracy of the inverse dynamics model 107. For example, the energy kernels define the energy using a function of kinetic energy and a function of potential energy. Such kernels advantageously consider laws of preservation of energy of the mechanical system 109.

To that end, at block 301 of the method 300, a Lagrangian function that describes the mechanical system 109 in terms of energies of the mechanical system 109, i.e., kinetic energy and potential energy, is defined. For instance, the Lagrangian function, such as $\mathcal{L}(q,\dot{q})$, is defined as a difference between the kinetic energy and the potential energy of the mechanical system 109

$$\mathcal{L}(q,\dot{q}) = \mathcal{T}(q,\dot{q}) - \mathcal{V}(q)$$

where $\mathcal{T}(q,\dot{q})$ and $\mathcal{V}(q)$ are, respectively, the kinetic energy and the potential energy of the mechanical system 109 with n degrees of freedom.

At block 303 of the method 300, the kinetic energy $\mathcal{T}(q,\dot{q})$ and the potential energy $\mathcal{V}(q)$ are defined as two independent zero-mean Gaussian Processes (GPS) with covariance determined by kernel functions $k^{\mathcal{T}}(x, x')$ and $k^{\mathcal{V}}(x, x')$ $$\mathcal{T} \sim GP\left(0, k^{\mathcal{T}}(x, x')\right),$$
$$\mathcal{V} \sim GP\left(0, k^{\mathcal{V}}(x, x')\right).$$

where $x=[q,\dot{q},\ddot{q}]$ with q being the joint positions, $\dot{q}$ being the joint velocities and $\ddot{q}$ being the joint accelerations. A GP prior on $\mathcal{T}(q,\dot{q})$ and $\mathcal{V}(q)$ cannot be used directly in GPR to compute posterior distributions since the kinetic energy and the potential energy are not measured. However, starting from the GP prior on the kinetic energy and the potential energy, some embodiments derive a GP prior for the torques of the inverse dynamics by relying on Lagrangian mechanics. Lagrangian mechanics states that inverse dynamics equations $$B(q)\ddot{q} + c(q,\dot{q}) + g(q) + \tilde{\tau} = \tau,$$

also named Lagrange's equations, where B(q) is an inertia matrix, $c(q,\dot{q})$ and g (q) account, respectively, for contributions of fictitious forces and gravity, and $\tilde{\tau}$ are torques due to friction and unknown dynamical effects, are solutions of a set of differential equations of the Lagrangian function $\mathcal{L}(q,\dot{q})$. The differential equation of the i-th row is $$\frac{\partial \mathcal{L}}{dt}\left(\frac{\partial \mathcal{L}}{\partial \dot{q}^i}\right) - \frac{\partial \mathcal{L}}{\partial q^i} = \tau^i,$$

where $q^i$, $\dot{q}^i$ and $\tau^i$ are, respectively, i-th component of $q,\dot{q}$ and $\tau$. The Lagrangian equations can be rewritten avoiding explicit differentiation with respect to time using a chain rule, which leads to following linear partial differential equation of $\mathcal{L}$.

$$\sum_{j=1}^{n}\left(\frac{\partial^2 \mathcal{L}}{\partial \dot{q}^i \partial \dot{q}^j}\ddot{q}^j + \frac{\partial^2 \mathcal{L}}{\partial \dot{q}^i \partial q^j}\dot{q}^j\right) - \frac{\partial \mathcal{L}}{\partial q^i} = \tau^i.$$

At block 305 of the method 300, a Lagrangian operator $G_i$ that maps the Lagrangian function $\mathcal{L}$ of the mechanical system 109 to the torques $\tau_i$ of the different actuators, is defined by a set of partial differential equations as $$\mathcal{G}_i\mathcal{L} = \sum_{j=1}^{n}\left(\frac{\partial^2 \mathcal{L}}{\partial \dot{q}^i \partial \dot{q}^j}\ddot{q}^j + \frac{\partial^2 \mathcal{L}}{\partial \dot{q}^i \partial q^j}\dot{q}^j\right) - \frac{\partial \mathcal{L}}{\partial q^i} = \tau^i,$$

-continued and $$\tau = \mathcal{G}\mathcal{L} = [\mathcal{G}_1\mathcal{L} \;\cdots\; \mathcal{G}_n\mathcal{L}]^T.$$

Some embodiments define the model of $\mathcal{L}$ as a GP since $\mathcal{T}$ and $\mathcal{V}$ are two independent GPs. This is because the sum of two independent GPs is a GP, and its kernel is a sum of kernels, namely, $$\mathcal{L} \sim GP\left(0, k^{\mathcal{L}}(x, x')\right),$$
$$k^{\mathcal{L}}(x, x') = k^{\mathcal{T}}(x, x') + k^{\mathcal{V}}(x, x').$$

Further, applying property of GPs and linear operators to $\tau=\mathcal{G}\mathcal{L}(x)$, the inverse dynamics is modeled as $\tau \sim GP(0, k^{\tau}(x, x'))$ a zero mean GP, with covariance function $k^{\tau}(x, x')$) named Lagrangian polynomial kernel.

To this end, at block 307 of the method 300, the Lagrangian polynomial kernel that defines the inverse dynamics model 107 is computed based on the Lagrangian operator, the kernel function $k^{\mathcal{T}}$ of the kinetic energy and the kernel function $k^{\mathcal{V}}$ of the potential energy as $$k^{\tau}(x, x') = \begin{bmatrix} \mathcal{G}_1\mathcal{G}_1' k^{\mathcal{L}}(x, x') & \cdots & \mathcal{G}_1\mathcal{G}_n' k^{\mathcal{L}}(x, x') \\ \vdots & \ddots & \vdots \\ \mathcal{G}_n\mathcal{G}_1' k^{\mathcal{L}}(x, x') & \cdots & \mathcal{G}_n\mathcal{G}_n' k^{\mathcal{L}}(x, x') \end{bmatrix}$$

Therefore, some embodiments of the present disclosure model the inverse dynamics function as an unknown multi-input multi-output function f(x): $R^{3n} \rightarrow R^n$.

Some embodiments are based on the realization that the kernel functions $k^{\mathcal{V}}$ and $k^{\mathcal{T}}$ used to define the prior on the potential energy and on the kinetic energy can be formulated as polynomial functions in a space defined by a trigonometric transformation of the state of the mechanical system 109. Such a formulation gives a physics informed structure to the kernel functions with a compact number of parameters to be learned.

Therefore, at block 309, $k^{\mathcal{T}}$ of the kinetic energy and the kernel function $k^{\mathcal{V}}$ of the potential energy are characterized as polynomial functions. The kernel functions $k^{\mathcal{V}}$ and $k^{\mathcal{T}}$ are defined based on two propositions that characterize $\mathcal{V}$ and $\mathcal{T}$ as polynomial functions in a space defined by a trigonometric transformation of the state of the mechanical system 109. The state of the mechanical system 109 may include the positions and velocities of the joints of the mechanical system 109. The trigonometric transformation is defined as follows.

Let $q^i$, $\dot{q}^i$ be vectors including the positions and the velocities of the joints up to index i, respectively:

$$q^i = [q^1, \ldots, q^i]^T \in \mathbb{R}^i,$$
$$\dot{q}^i = [\dot{q}^1, \ldots, \dot{q}^i]^T \in \mathbb{R}^i.$$

$N_r$ and $N_p$ are, respectively, a number of revolute and prismatic joints, with $N_r+N_p=n$. Sets $I_r=\{r_1, \ldots, r_{N_r}\}$ and $I_p=\{p_1, \ldots, p_{N_p}\}$ include the revolute and prismatic joints indexes, respectively. Further, following vectors are defined:

$$q_c = [\cos(q^{r_1}), \ldots, \cos(q^{r_{N_r}})]^T \in \mathbb{R}^{N_r},$$

$$q_s = [\sin(q^{r_1}), \ldots, \sin(q^{r_{N_r}})]^T \in \mathbb{R}^{N_r},$$

$$q_p = \left[q^{p_1}, \ldots, q^{p_{N_p}}\right]^T \in \mathbb{R}^{N_p}.$$

$$q_c^b, q_s^b \text{ and } q_p^b$$

denote b-th element of $q_c$, $q_s$ and $q_p$, respectively.

Next, let $$I_r^i \left(resp.\ I_p^i\right)$$

be a subset of $I_r$ (resp. $I_p$) composed by indexes lower or equal to i and the vectors $$q_c^i, q_s^i, \left(resp.\ q_p^i\right)$$

are defined as restriction of $q_c$, $q_s$ (resp. $q_p$) to $$I_r^i \left(resp.\ I_p^i\right).$$

For the sake of clarity, consider the following example. Let index i be such that $r_j \le i < r_{j+1}$ for some $1 \le j < r_{N_r}$. Then $$I_r^i = \{r_1, \ldots, r_j\} \in \mathbb{R}^j,$$

$$q_c^i = [\cos(q^{r_1}), \ldots, \cos(q^{r_i})]^T \in \mathbb{R}^j$$

and $$q_s^i = [\sin(q^{r_1}), \ldots, \sin(q^{r_j})]^T \in \mathbb{R}^j.$$

To conclude let $q_{cs_b}$ be the vector concatenating the b-th elements of $q_c$ and $q_s$, that is, $$q_{cs_b} = \left[q_c^b, q_s^b\right]^T.$$

According to an embodiment, the kernel function of the potential energy $k^{\mathcal{V}}$ is a polynomial function in a space defined by a trigonometric transformation $m_{\mathcal{V}}$ of the state of the mechanical system 109. The following proposition establishes that the potential energy is polynomial with respect to a set of variables $m_{\mathcal{V}}=(q_c,q_s,q_p)$ that are functions of the joint positions vector q. $m_{\mathcal{V}}$ is the trigonometric transformation of the state of the mechanical system 109 that is the space over which the potential energy is a polynomial function.

Proposition-1: Consider a manipulator with n+1 links and n joints. Total potential energy $\mathcal{V}(q)$ belongs to space $\mathbb{P}_{(n)}(q_{c_{(1)}}, q_{s_{(1)}}, q_{p_{(1)}})$, namely it is a polynomial function in $(q_c,q_s,q_p)$ of degree not greater than n, such that each element of $q_c$, $q_s$ and $q_p$ appears with degree not greater than 1. Moreover, for any monomial of the aforementioned polynomial, a sum of degrees of $$q_c^b \text{ and } q_s^b$$

is equal or lower than 1, namely, it holds $$\deg\left(q_c^b\right) + \deg\left(q_s^b\right) \le 1.$$

To comply with constraints on the maximum degree of each term, the kernel function $k^{\mathcal{V}}(x, x')$ is defined as a product of $N_r+N_p$ inhomogeneous polynomial kernels where $N_r$ kernels have p=1 and each of them is defined on the 2-dimensional input space given by $q_{cs_b}$, $b\in I_r$, and $N_p$ kernels have p=1 and each of them is defined on the 1-dimensional input $$q_p^b,$$

$b\in I_p$. Resulting kernel function for the potential energy is then given by $$k^{\mathcal{V}}(x, x') = \prod\nolimits_{b\in I_r} k_{pk}^{(1)}\left(q_{cs_b}, q'_{cs_b}\right) \prod\nolimits_{b\in I_p} k_{pk}^{(1)}\left(q_p^b, q_p'^b\right). \quad \text{(A)}$$

Each of n kernels accounts for contribution of a distinct joint, and the potential energy kernel $k^{\mathcal{V}}(x, x')$ spans $\mathbb{P}_{(n)}(q_{c_{(1)}}, q_{s_{(1)}}, q_{p_{(1)}})$. Further, since all the $N_r$ kernels defined on $q_{cs_b}$, $b\in I_r$, have p=1, constraint $$\deg\left(q_c^b\right) + \deg\left(q_s^b\right) \le 1$$

is satisfied.

Further, some embodiments are based on the observation that total kinetic energy is a sum of the kinetic energies relative to each link, that is, $$\mathcal{T}(q, \dot{q}) = \sum\nolimits_{i=1}^{n} \mathcal{T}_i(q, \dot{q}),$$

where $\mathcal{T}_i(q,\dot{q})$ is the kinetic energy of link i. The kinetic energy $\mathcal{T}_i$ is a polynomial function with respect to a set of variables $$m_{\mathcal{T}} = \left(q_c^i, q_s^i, q_P^i, \dot{q}^i\right),$$

which are functions of the joints positions and velocities vectors $q^i$ and $\dot{q}_i$. Therefore, the following proposition is established for the kinetic energy.

Proposition-2: Consider a manipulator with n+1 links and n joints. The kinetic energy $\mathcal{T}_i(q,\dot{q})$ of link i belongs to $\mathbb{P}_{(2i+2)}$ $$\left(q^i_{c(2)}, q^i_{s(2)}, q^i_{p(2)}\dot{q}^i_{(2)}\right),$$

namely it is a polynomial function in $$\left(q^i_c, q^i_s, q^i_p, \dot{q}^i\right)$$

of degree not greater than 2i+2, such that:

(i) each element of $$q^i_c, q^i_s, q^i_p \text{ and } \dot{q}^i$$

appears with degree not greater than 2;

each monomial has inside a term of the type $\dot{q}^i\dot{q}^j$ for $1 \le i \le n$ and $i \le j \le n$; and in any monomial a sum of degrees of $$q^b_c \text{ and } q^b_s$$

is equal or lower than 2, namely $$\deg(q^b_c) + \deg(q^b_s) \le 2.$$

To comply with constraints and properties stated in the above proposition, a kernel function given by a product of i inhomogeneous polynomial kernels and 1 homogeneous kernel is adopted, where $$|I^i_r|$$

inhomogeneous kernels have p=2 and each of them is defined on the 2-dimensional input space given by $q_{cs_b}$, $b \in I_r$;

$$|I^i_p|$$

inhomogeneous kernels have p=2 and each of them is defined on the 1-dimensional input $$q^b_p,$$

$b \in I_p$;

1 homogeneous kernel have p=2 and is defined on the i-dimensional input $\dot{q}^i$.

Resulting kernel function for the kinetic energy is then given by $$\mathrm{k}^{\mathcal{T}}_i(x, x') = k^{(2)}_{hpk}(\dot{q}^i, \dot{q}'^i)\prod\nolimits_{b \in I^i_r} k^{(2)}_{pk}(q_{cs_b}, q'_{cs_b}) \cdot \prod\nolimits_{b \in I^i_p} k^{(2)}_{pk}(q^b_p, q'^b_p) \quad \text{(B)}$$

where $$|I^i_r| + |I^i_p| = i.$$

As all the kernels have p=2, properties (i) and (iii) of the proposition-2 are satisfied. Further, using a homogeneous kernel defined on $\dot{q}^i$ with p=2 guarantees validity of property (ii). Finally, the kernel function of the kinetic energy, $\mathrm{k}^{\mathcal{T}}$ is defined as $$\mathrm{k}^{\mathcal{T}}(x, x') = \sum\nolimits_{i=1}^{n} \mathrm{k}^{\mathcal{T}}_i(x, x').$$

At block 311 of the method 300, the Lagrangian polynomial kernel, $\mathrm{k}^\tau$, that defines the inverse dynamics model 107 is computed based on the Lagrangian operator $\mathcal{G}$, the kernel function of the potential energy (eqn. A) and the kernel function of the kinetic energy (eqn. B) characterized as the polynomial functions $$k^\tau(x, x') = \begin{bmatrix} \mathcal{G}_1\mathcal{G}'_1 k^{\mathcal{L}}(x, x') & \ldots & \mathcal{G}_1\mathcal{G}'_n k^{\mathcal{L}}(x, x') \\ \vdots & \ddots & \vdots \\ \mathcal{G}_n\mathcal{G}'_1 k^{\mathcal{L}}(x, x') & \ldots & \mathcal{G}_n\mathcal{G}'_n k^{\mathcal{L}}(x, x') \end{bmatrix}.$$

where $$k^{\mathcal{L}}(x, x') = k^{\mathcal{T}}(x, x') + k^{\mathcal{V}}(x, x') = k^{(2)}_{hp}(\dot{q}^i, \dot{q}'^i)\prod\nolimits_{b \in I^i_r} k^{(2)}_p(q_{cs_b}, q'_{cs_b})\prod\nolimits_{b \in I^i_p} k^{(2)}_p(q^b_p, q'^b_p) + \prod\nolimits_{b \in I^i_r} k^{(1)}_p(q_{cs_b}, q'_{cs_b})\prod\nolimits_{b \in I^i_p} k^{(1)}_p(q^b_p, q'^b_p)$$

adopting for $\mathrm{k}^{\mathcal{V}}$ and $\mathrm{k}^{\mathcal{T}}$ the polynomial functions defined above and $\mathcal{G}_i$, $\mathcal{G}'_i$ are elements of the Lagrangian operator $\mathcal{G}$. Proposition-1 characterizes the potential energy $\mathcal{V}$ of the whole mechanical system 109, while proposition 2 focuses on the kinetic energy of each link. In general, characterizing the energies for each link and designing a tailored kernel to be combined as executed for $\mathrm{k}^{\mathcal{T}}$ allows for higher flexibility in terms of regularization and for more accurate predictions.

Figure 4:
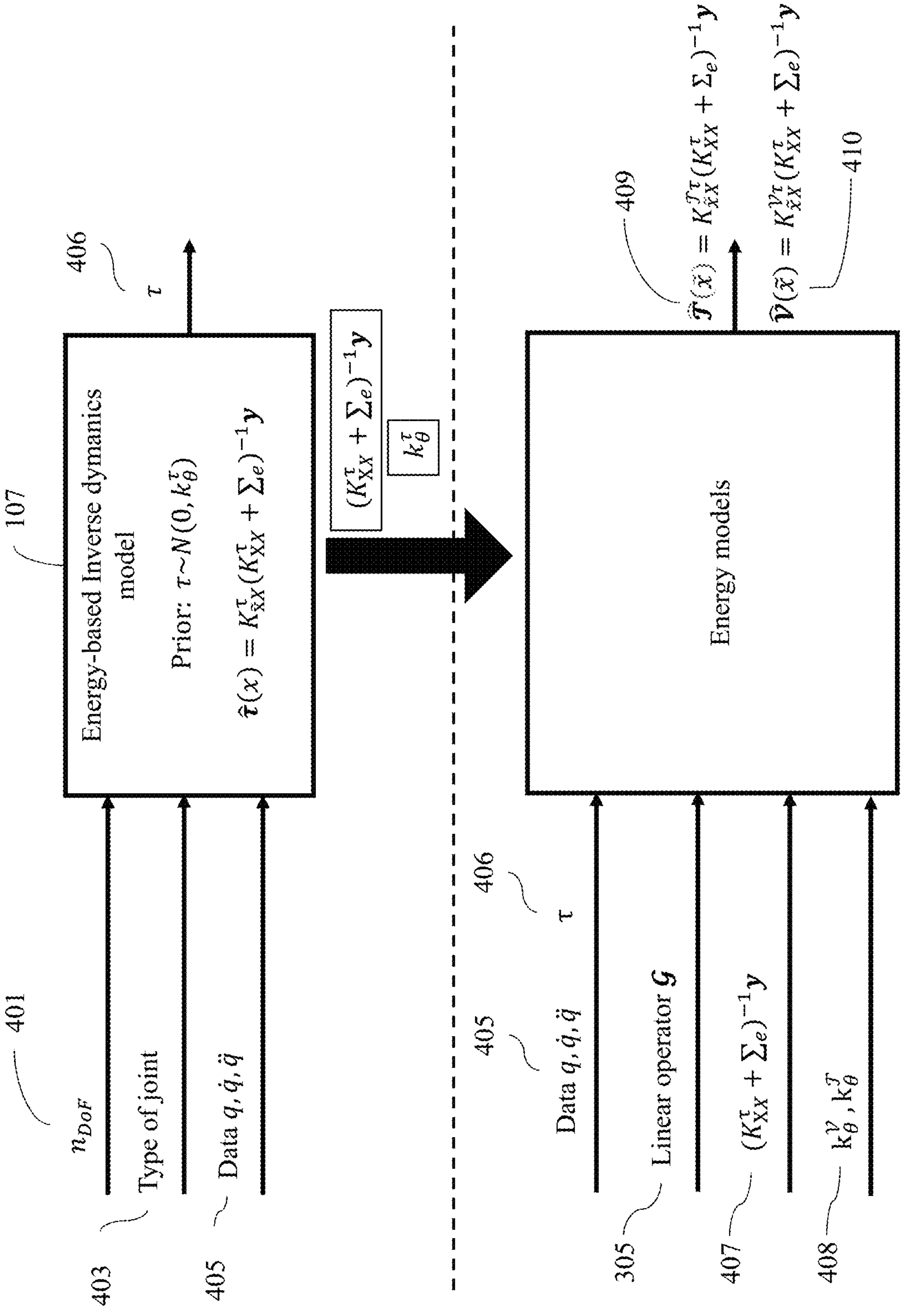
FIG. 4 illustrates a block diagram showing training of hyperparameters of a Lagrangian polynomial kernel, according to an embodiment.

FIG. 4 illustrates training of the one or more hyperparameters, indicated with the symbol θ, of the Lagrangian polynomial kernel, according to an embodiment. Training input data, which includes a number of degrees of freedom $n_{DoF}$ 401, a type of the joint (i.e., revolute joint or prismatic joint) 403, data $q,\dot{q},\ddot{q}$ 405 that are the joint positions, joint velocities and joint accelerations, respectively (i.e. states of a system), and data τ 406, that are the torques, is obtained by executing one or more trajectories in the mechanical system 109, are used to train the one or more hyperparameters of the Lagrangian polynomial kernel that defines the inverse dynamics model 107. The number of degrees of freedom $n_{DoF}$ 401, and type of the joint 403 are inputs that a user specifies, and are the only knowledge required for the mechanical system 109. The data $q,\dot{q},\ddot{q}$ 405 and data $\tau$ 406 are obtained by executing trajectories on the mechanical system 109, that may be a sequence of positions if the mechanical system 109 is controlled in position, or a sequence of velocities if the mechanical system 109 is controlled in velocity or a sequence of torques if 109 is controlled in torque. In some embodiments, for example, these trajectories may be the sum of sinusoids in the joint positions q.

In an embodiment, input of the energy-based inverse dynamics model 107 during training is the data $q,\dot{q},\ddot{q}$ 405 and labels are the torques data 406. The one or more hyperparameters can be trained based on any machine learning algorithm. In some embodiments, the one or more hyperparameters are learned with a machine learning algorithm using maximization of marginal likelihood. The one or more hyperparameters are the parameters that define the kernel function of the Gaussian process. For example, in a standard squared exponential kernel the one or more hyperparameters may be scaling factors and length scales of the squared exponential function. In some embodiments, the one or more hyperparameters may be coefficients of the polynomial functions that define the Lagrangian kernel $k^{\mathcal{L}}(x, x')$.

According to some embodiments, the inverse dynamics model 107 is a multi-input-multi-output (MIMO) torque estimator model that produces the torques for the different actuators based on the positions of the joints of the mechanical system 109, and velocity and acceleration of the joints providing multiple degrees of freedom. In other words, the positions of the joints, and velocity and acceleration of the multiple degrees of freedom are applied as input to the MIMO torque estimator, and the MIMO torque estimator outputs the torques for the different actuators.

Additionally, or alternatively, in some embodiments, the inverse dynamics model 107 is used to estimate the kinetic energy and the potential energy from torque measurements. For instance, the processor 103 may be configured to process the states of the different actuators with the trained inverse dynamics model 107 to estimate the kinetic energy of the mechanical system 109 and the potential energy of the mechanical system 109. According to some embodiments, after the training of the inverse dynamics 107, the estimate 409 of kinetic energy and the estimate 410 of potential energy may be computed without requiring further training for such computation of the energies. That is, the training of the model 107 does not require labeled data for the kinetic and/or potential energy. Indeed, the hyperparameters of the torque kernel $$k_\theta^\tau$$

are the hyperparameters of the Lagrangian Kernel $k^{\mathcal{L}}(x, x')$, that is the sum of the potential energy kernel and of the kinetic kernel as described previously in this disclosure. According to some embodiments, the potential energy can be computed by combining the quantity 407 obtained during the estimation of the inverse dynamics of the system, the potential kernel $$k_\theta^V$$

in 408 and the linear operator that maps the Lagrangian function to torques determined at step 305 of FIG. 3. The quantities 407 and the potential kernel in 408 are evaluated at the data points 405, 406, therefore the data 405, 406 are also necessary to estimate the potential energy. According to some embodiments, the kinetic energy can be computed by combining the quantity 407, obtained during the estimation of the inverse dynamics of the system, the kinetic kernel $$k_\theta^{\mathcal{T}}$$

in 408 and the linear operator that maps the Lagrangian function to torques determined at step 305 of FIG. 3. The quantities 407 and the kinetic kernel in 408 are evaluated at the data points 405, 406, and therefore the data 405, 406 are also necessary in estimating the kinetic energy. The estimation of the kinetic energy is described in detail later in FIG. 5A and the estimation of the potential energy is explained in detail in FIG. 5B, and mathematically in the remainder of this disclosure.

Inverse Dynamics Model of Underactuated Systems Under the Rigid Body Assumption Consider a mechanical system with n-DOF and let $q \in \mathbb{R}^n$ be the vector of generalized coordinates. The system may have m control inputs (where m<n), each of which actuates a single DOF. The vector $q \in \mathbb{R}^n$ may be partitioned as $$q^T = [q_1^T, q_2^T],$$

where $q_1 \in \mathbb{R}^m$ and $q_2 \in \mathbb{R}^{n-m}$ refer respectively to the actuated and the non-actuated DOFs. Under the rigid body assumption, the inverse dynamics of the underactuated system can be derived from the Euler-Lagrange equations as:

(1)

$$\underbrace{\begin{bmatrix} M_{11}(q) & M_{12}(q) \\ M_{21}(q) & M_{22}(q) \end{bmatrix} \begin{bmatrix} \ddot{q}_1 \\ \ddot{q}_2 \end{bmatrix}}_{m(q,\ddot{q})} + \underbrace{\begin{bmatrix} c_1(q,\dot{q}) \\ c_2(q,\dot{q}) \end{bmatrix}}_{c(q,\dot{q})} \underbrace{\begin{bmatrix} g_1(q) \\ g_2(q) \end{bmatrix}}_{g(q)} = \underbrace{\begin{bmatrix} \tau_1 \\ 0 \end{bmatrix}}_{\tau} \quad (1)$$

where $$M(q) = \begin{bmatrix} M_{11}(q) & M_{12}(q) \\ M_{21}(q) & M_{22}(q) \end{bmatrix}$$

is the symmetric, positive definite inertia matrix, $m(q,\ddot{q})$ represents the inertial torque, $c(q,\dot{q})$ accounts for the Coriolis and centripetal torques, g(q) represents the gravity contribution while $\tau_1 \in \mathbb{R}^m$ is the vector of generalized torques produced by the m actuators.

The inverse dynamics identification problem consists of estimating the map in eq. (1) that relates $\tilde{x}=(q,\dot{q},\ddot{q})$ and the torques $\tau$ from a set of noisy measures. Black-box solutions treat the inverse dynamics as an unknown function and, generally, rely on universal approximators to estimate the function from experimental data. According to some embodiments, GPR, which is a framework for Bayesian inference widely used in machine learning and robotics, may be adopted in this regard.

The standard approach when using GPR consists of considering the different torque components independently and solving n independent regression problems, one for each generalized coordinate. However, with underactuated systems, torques of the under-actuated dimensions are constant signals equal to zero, leading to an ill-posed estimation problem. This black-box setup prevents the possibility of deriving any inverse dynamics model useful for model-based control strategies.

Model-Based Balancing Control of Underactuated Systems

A particular class of robots described by eq. (1), are known as balancing systems. Common examples of balancing systems are the Cartpole, the Furuta Pendulum, the Acrobot, and the Pendubot. Within such systems, the typical control challenge requires swinging up and balancing the robot in the unstable equilibrium point, hereafter denoted by $$x_\star = [q_\star^T, \dot{q}_\star^T]^T$$

with $\dot{q}_\star=0$.

Energy-Based Swing-Up Controller

The first step consists of a partial feedback linearization. From eq. (1) the dynamics of the actuated and non-actuated subsystems are isolated respectively as $$M_{11}\ddot{q}_1 + M_{12}\ddot{q}_2 + c_1 + g_1 = \tau_1 \quad (2)$$

$$M_{21}\ddot{q}_1 + M_{22}\ddot{q}_2 + c_2 + g_2 = 0 \quad (3)$$

Eq. (3) may be solved for $$\ddot{q}_2 \text{ as } \ddot{q}_2 = -M_{22}^{-1}$$

$(M_{21}\ddot{q}_1+c_2+g_2)$ since $M_{22}$ is invertible (given that M>0). Substituting the resulting expression into eq. (2) leads to $$\bar{M}_{11}\ddot{q}_1 + \bar{c}_1 + \bar{g}_1 = \tau_1 \quad (4)$$

$$\text{with } \bar{M}_{11} = M_{11} - M_{12}M_{22}^{-1}M_{21},$$

$$\bar{c}_1 = c_1 - M_{12}M_{22}^{-1}c_2 \text{ and } \bar{g}_1 = g_1 - M_{12}M_{22}^{-1}g_2.$$

A feedback linearizing controller for eq. (4) can be defined as $$\tau_1 = \bar{M}_{11}u + \bar{c}_1 + \bar{g}_1 \quad (5)$$

where u is a design parameter. Choosing $\tau_1$ as in eq. (5) leads to the following closed-loop system:

$$\ddot{q}_1 = u \quad (6)$$

-continued $$M_{22}\ddot{q}_2 + c_2 + g_2 = -M_{21}u \quad (7)$$

A linear second-order dynamics for the actuated subsystem may be obtained. Selecting u according to $$u = -k_1q_1 - k_2\dot{q}_1 + \bar{u},\ k_1, k_2 > 0 \quad (8)$$

makes the linear subsystem in eq. (6) asymptotically stable for $\bar{u}=0$. The remaining design problem is the choice of $\bar{u}$, which can be used to stabilize the non-actuated dynamics in eq. (7). According to some embodiments, $\bar{u}$ may be designed based on energy concepts, penalizing the mismatch with respect to the system energy at the desired configuration. This leads to control laws of the form $$\bar{u} = f_e(\mathcal{T}, \mathcal{V}) \quad (9)$$

where $$\mathcal{T}(q, \dot{q}) = \frac{1}{2}\dot{q}^T M(q)\dot{q}$$

is the kinetic energy, while $\mathcal{V}(q)$ denotes the potential energy. However, the choice of $f_e$ depends on the system of interest.

It may be noted that the controller presented in this section is not stabilizing the system to a fixed point but only to a manifold. For this reason, in applications such as the swing up of balancing robots, the control must switch to another controller achieving local asymptotic stability to the equilibrium.

Linear Quadratic Regulator

To stabilize the system at the equilibrium $x_\star$ we resort to a Linear Quadratic Regulator (LQR). First, a state space description for the system may be provided with dynamics expressed in eq. (1). Let the system state x be such that $x^T=[q^T, \dot{q}^T]$. The state evolution can be derived from eq. (1) as $$\dot{x} = \begin{bmatrix} \dot{q} \\ -M^{-1}(q)[c(q, \dot{q}) + g(q)] \end{bmatrix} + \begin{bmatrix} 0_n \\ M^{-1}(q) \end{bmatrix}\tau = f(x) + g(x, \tau) \quad (10)$$

Then the non-linear system in eq. (10) may be linearized around $$x_\star^T.$$

Moreover, let $\tau_\star$ be the reference input at the equilibrium. Applying a first-order Taylor expansion, the system dynamics around $(x_\star, \tau_\star)$ can be approximated as $$\dot{x} = A(x - x_\star) + B(\tau - \tau_\star) \quad (11)$$

Recalling that at the equilibrium $\dot{q}_\star=0$ matrices A and B are $$A = \frac{\partial f^T}{\partial x}\Big|_{x_\star,\tau_\star} = \begin{bmatrix} 0 & I \\ -M^{-1}(q)\frac{\partial g(q)}{\partial q} & M^{-1}(q)C(q,\dot{q}) \end{bmatrix}\Big|_{x_\star,\tau_\star} = \begin{bmatrix} 0 & I \\ -M^{-1}(q_\star)\frac{\partial g(q_\star)}{\partial q} & 0 \end{bmatrix} \tag{12}$$

and $$B = \frac{\partial g^T}{\partial \tau}\Big|_{x_\star,\tau_\star} = \begin{bmatrix} 0 \\ M^{-1}(q_\star) \end{bmatrix} \tag{13}$$

where $C(q,\dot{q})\in\mathbb{R}^{n\times n}$ is the skew-symmetric Coriolis matrix, such that $c(q,\dot{q})=C(q,\dot{q})\dot{q}$.

Then, the infinite horizon control problem on the linearized system is, namely, $$\underset{\tau}{\operatorname{argmin}} \int_0^\infty (x-x_\star)^T Q(x-x_\star) + (\tau-\tau_\star)^T R(\tau-\tau_\star)^T dt$$

which leads to the control input $\tau=-Kx$, with K being the optimal control gain, which can be computed by solving the continuous time algebraic Riccati equation.

Lagrangian Inspired Polynomial Estimator for Modeling and Control of Under-Actuated Systems The LIP estimator is based on GP, which is a framework for Bayesian inference widely used in machine learning and robotics applications. Generally, GPR solutions for inverse dynamics identification model each torque component $\tau^i(\tilde{x})$ as a Gaussian Process (GP) by assuming $\tau^i(\tilde{x})$s are independent given $\tilde{x}$, and then apply standard GPR inference. As discussed in the previous section, this approach is not effective for underactuated systems. The LIP estimator follows an alternative strategy and defines the kinetic and potential energies as two independent GPs. Then, it derives a multi-output kernel of the torques by exploiting EL equations. In this way, the inverse dynamics problem is well defined also in the underactuated setup.

Some embodiments model $\mathcal{T}$ and $\mathcal{V}$ as independent GPs, namely $\mathcal{T}\sim\mathcal{GP}(0, k^{\mathcal{T}}(\bullet,\bullet))$ and $\mathcal{V}\sim\mathcal{GP}(0, k^{\mathcal{V}}(\bullet,\bullet))$, where $k^{\mathcal{T}}$ and $k^{\mathcal{V}}$ are the kernels functions that defines the covariance of $\mathcal{T}$ and $\mathcal{V}$. For instance, let $\tilde{x}$ and $\tilde{x}'$ be two input locations, then the covariance between the values of $\mathcal{T}$ at $\tilde{x}$ and $\tilde{x}'$ is $E[\mathcal{T}(\tilde{x}), \mathcal{T}(\tilde{x}')]= k^{\mathcal{T}}(\tilde{x}, \tilde{x}')$. For convenience, $$K^{\mathcal{T}}_{XX'},$$

that is the matrix that collects $k^{\mathcal{T}}$ evaluated at $X=\{\tilde{x}_1, \ldots, \tilde{x}_N\}$, $$X' = \{x'_1, \ldots, x'_M\}$$

is given as:

$$K^{\mathcal{T}}_{xx'} = \begin{bmatrix} k^{\mathcal{T}}(\tilde{x}_1, \tilde{x}'_1) & \ldots & k^{\mathcal{T}}(\tilde{x}_1, \tilde{x}'_M) \\ \vdots & \vdots & \vdots \\ k^{\mathcal{T}}(\tilde{x}_N, \tilde{x}'_1) & \ldots & k^{\mathcal{T}}(\tilde{x}_N, \tilde{x}'_M) \end{bmatrix}.$$

Similarly, $$K^{\mathcal{V}}_{xx'} = \begin{bmatrix} k^{\mathcal{V}}(\tilde{x}_1, \tilde{x}'_1) & \ldots & k^{\mathcal{V}}(\tilde{x}_1, \tilde{x}'_M) \\ \vdots & \vdots & \vdots \\ k^{\mathcal{V}}(\tilde{x}_N, \tilde{x}'_1) & \ldots & k^{\mathcal{V}}(\tilde{x}_N, \tilde{x}'_M) \end{bmatrix}$$

The LIP estimator defines $k^{\mathcal{T}}$ and $k^{\mathcal{V}}$ relying on a polynomial formulation as described previously with reference to FIG. 3.

It may be noted that, (i) since $\mathcal{T}$ and $\mathcal{V}$ are defined as zero-mean GPS, for the properties of GPs also the Lagrangian function $\mathcal{L}=\mathcal{T}-\mathcal{V}$ is a zero-mean GP with kernel $k^{\mathcal{L}}(\bullet,\bullet)= k^{\mathcal{T}}(\bullet,\bullet)+ k^{\mathcal{V}}(\bullet,\bullet)$, namely $\mathcal{L}\sim\mathcal{GP}(0, k^{\mathcal{L}}(\bullet,\bullet))$. Furthermore, (ii) under rigid body assumptions, each $\tau^i(\tilde{x})$ is described by a linear differential equation of $\mathcal{L}$, namely, $$\tau^i = \frac{d}{dt}\left(\frac{\partial \mathcal{L}}{\partial \dot{q}^i}\right) - \frac{\partial \mathcal{L}}{\partial q^i}.$$

Expanding explicit derivations with respect to time, gives:

$$\tau^i = \sum_{j=1}^n \left(\frac{\partial^2 \mathcal{L}}{\partial \dot{q}^i \partial \dot{q}^j}\ddot{q}^j + \frac{\partial^2 \mathcal{L}}{\partial \dot{q}^i \partial q^j}\dot{q}^j\right) - \frac{\partial \mathcal{L}}{\partial q^i} =: \mathcal{G}_i\mathcal{L},$$

where $\mathcal{G}_i$ is the linear operator that maps $\mathcal{L}$ in the linear differential equation of $\tau^i$. Finally, (iii) GPs are closed with respect to linear operators, namely, if f is a zero-mean GP with kernel $k^f(\bullet,\bullet)$ and $g(\tilde{x})= \mathcal{G}f(\tilde{x})$, then also $g(\tilde{x})$ is a zero-mean GP with kernel $k^g(\tilde{x}, \tilde{x}')= \mathcal{G}\mathcal{G}'k^f(\tilde{x}, \tilde{x}')$. The last expression means that $k^g(\tilde{x}, \tilde{x}')$ is obtained by applying two times the operator $\mathcal{G}$ to $k^f(\tilde{x}, \tilde{x}')$, first with respect to the input $\tilde{x}$ then w.r.t. $\tilde{x}'$.

Based on (i), (ii), and (iii), some embodiments realize that torques are a zero-mean GP, with covariance defined by a multi-output kernel $k^\tau(\tilde{x}, \tilde{x}')\in\mathbb{R}^{n\times n}$ that encodes the EL equations, and is expressed as $$k^\tau(\tilde{x}, \tilde{x}') = \begin{bmatrix} \mathcal{G}_1\mathcal{G}'_1 k^{\mathcal{L}}(\tilde{x}, \tilde{x}') & \ldots & \mathcal{G}_1\mathcal{G}'_n k^{\mathcal{L}}(\tilde{x}, \tilde{x}') \\ \vdots & \ddots & \vdots \\ \mathcal{G}_n\mathcal{G}'_1 k^{\mathcal{L}}(\tilde{x}, \tilde{x}') & \ldots & \mathcal{G}_n\mathcal{G}'_n k^{\mathcal{L}}(\tilde{x}, \tilde{x}') \end{bmatrix} \tag{14}$$

To derive (14) the multi-output version of property (iii) may be applied. This is also described previously with reference to FIG. 3.

Once $k^\tau$ is defined, torque estimates may be computed following standard GPR. Let X be a set of N training input locations, and $$y = [y_1^T, \ldots, y_N^T]^T$$

the respective torque measurements, with $y_i\in\mathbb{R}^n$ equal to the torque measures at input $\tilde{x}_i$. The LIP torque estimate in a general input location $\tilde{x}$ is $$\hat{\tau}(\tilde{x}) = K^{\tau}_{\tilde{x}X}\left(K^{\tau}_{XX} + \sum\nolimits_e\right)^{-1} y \tag{15}$$

where $\Sigma_e$ is a regularization parameter that accounts for the additive Gaussian noise modeled by GPR. For each dimension, independent and identically distributed noise may be assumed, thus obtaining a block diagonal matrix with equal diagonal blocks, namely $\Sigma_e=\mathrm{diag}(\Sigma_{e_1}, \ldots, \Sigma_{e_N})$, with $\Sigma_{e_1}=\Sigma_{e_2}= \ldots =\Sigma_{e_N}=\mathrm{diag}$ $$(\sigma^2_{e_1}, , \ldots , \sigma^2_{e_n}) \text{ where } \sigma^2_{e_i}$$

is the variance of the $\tau^i$ measures.

LIP for Control

Next the estimation of the kinetic and potential energies, the inertial, Coriolis, and gravity vector as well as $\partial g/\partial q$ required by the control laws presented with reference to eq. 9 is described.

Kinetic and Potential Energies

Figure 5A:
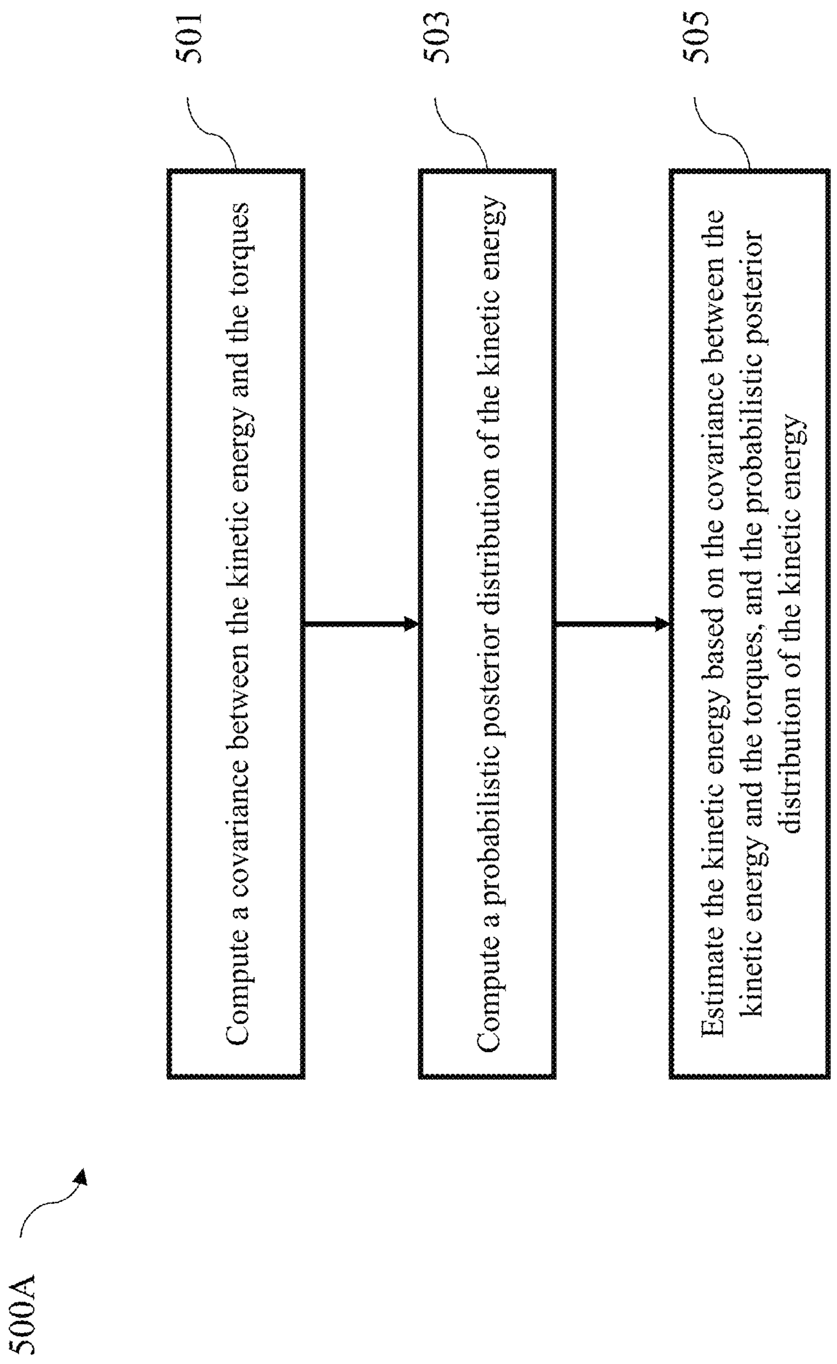
FIG. 5A illustrates a flow diagram of a method for estimation of kinetic energy of the mechanical system, according to some embodiments.
Figure 5B:
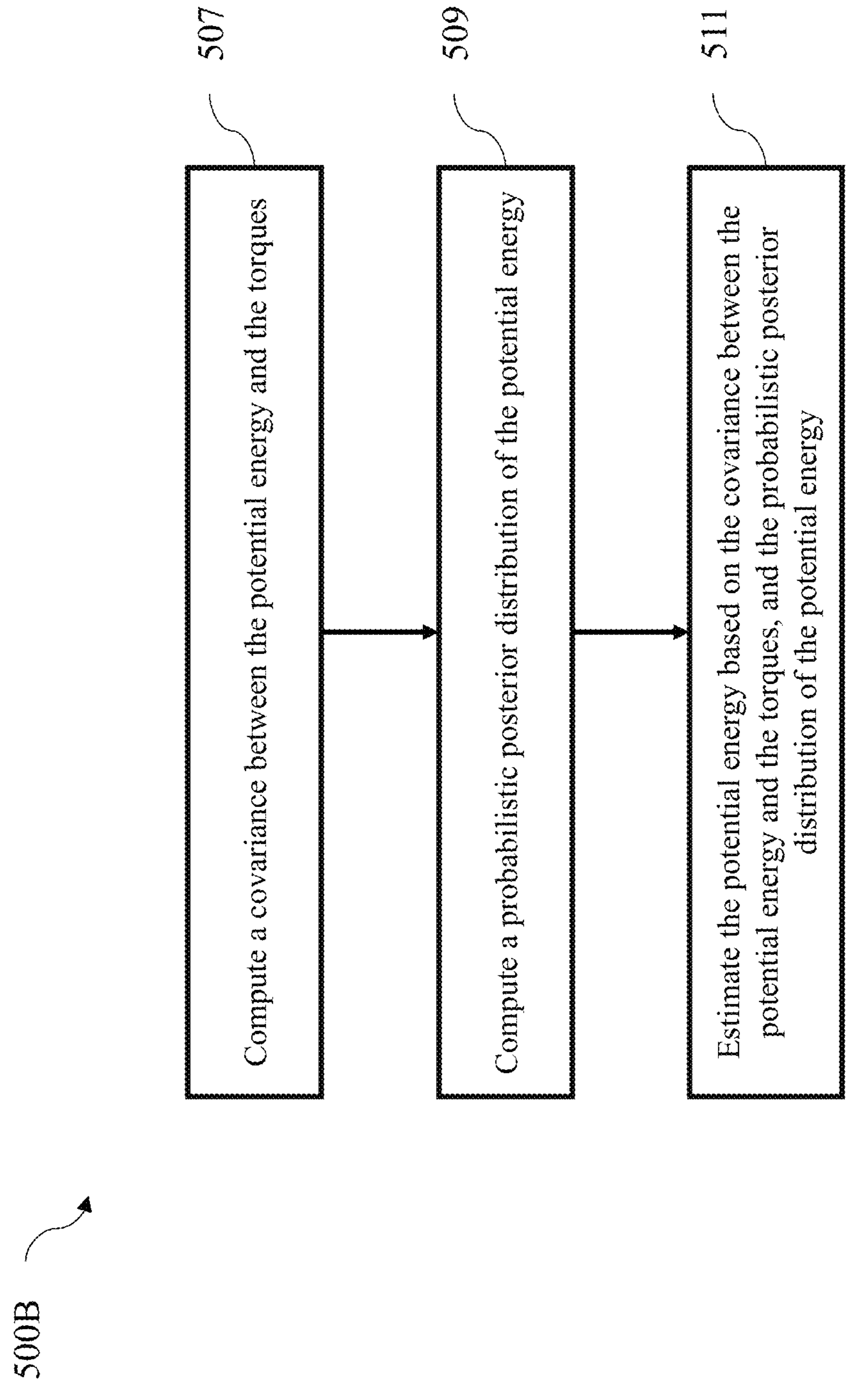
FIG. 5B illustrates a flow diagram of a method for estimation of potential energy of the mechanical system, according to some embodiments.

FIG. 5A illustrates a block diagram of a method 500A for estimation of the kinetic energy, according to some embodiments. FIG. 5B illustrates a block diagram of a method 500B for estimation of the potential energy, according to some embodiments.

The kinetic energy $\mathcal{T}$ and potential energy $\mathcal{V}$ are required to implement the energy based control law described by eq. (9). The LIP model provides a principled way to estimate them from the torque measurements y. Indeed, within the LIP framework, $\mathcal{T}$, $\mathcal{V}$, and $\tau$ are jointly Gaussian distributed, since the prior of $\tau$ is derived by applying the linear operator $\mathcal{G}$ to the kinetic and potential GPs $\mathcal{T}$ and $\mathcal{V}$. The covariances between $\mathcal{T}$ and $\tau$ and between $\mathcal{V}$ and $\tau$ at general input locations $\tilde{x}$ and $\tilde{x}'$ are $$\mathrm{Cov}[\mathcal{T}(\tilde{x}), \tau(\tilde{x}')] = \mathrm{Cov}[\mathcal{T}(\tilde{x}), \mathcal{G}\mathcal{L}(\tilde{x}')] =: k^{\mathcal{T}^{\tau}}(\tilde{x}, \tilde{x}'), \tag{16a}$$

$$\mathrm{Cov}[\mathcal{V}(\tilde{x}), \tau(\tilde{x}')] = \mathrm{Cov}[\mathcal{V}(\tilde{x}), \mathcal{G}\mathcal{L}(\tilde{x}')] =: k^{\mathcal{V}^{\tau}}(\tilde{x}, \tilde{x}'), \tag{16b}$$

Recalling that $\mathcal{T}$ and $\mathcal{V}$ are modelled as independent GPs, and in view of the properties of GPs under linear operators, $$k^{\mathcal{T}^{\tau}}(\tilde{x}, \tilde{x}') = \mathrm{Cov}[\mathcal{T}(\tilde{x}), \mathcal{G}\mathcal{T}(\tilde{x}')] = [\mathcal{G}'k^{\mathcal{T}}(\tilde{x}, \tilde{x}')]^T = \left[\mathcal{G}_1' k^{\mathcal{T}}(\tilde{x}, \tilde{x}'), \ldots , \mathcal{G}_n' k^{\mathcal{T}}(\tilde{x}, \tilde{x}')\right] \tag{17a}$$

$$k^{\mathcal{V}^{\tau}}(\tilde{x}, \tilde{x}') = \mathrm{Cov}[\mathcal{V}(\tilde{x}), \mathcal{G}\mathcal{V}(\tilde{x}')] = [\mathcal{G}' k^{\mathcal{V}}(\tilde{x}, \tilde{x}')]^T = \left[\mathcal{G}_1' k^{\mathcal{V}}(\tilde{x}, \tilde{x}'), \ldots , \mathcal{G}_n' k^{\mathcal{V}}(\tilde{x}, \tilde{x}')\right] \tag{17b}$$

may be obtained.

The Gaussian properties make the posterior distributions of $\mathcal{T}$ and $\mathcal{V}$ given y known analytically. At any general input location x, these posteriors are Gaussians distributions, therefore exactly defined by mean and variance. The means are computed as $$E[\mathcal{T}(x) \mid \mathcal{D}] = K^{\mathcal{T}\tau}_{xX}\left(K_{XX} + \sum\nolimits_e\right)^{-1} y, \tag{18a}$$

$$E[\mathcal{V}(x) \mid \mathcal{D}] = K^{\mathcal{V}\tau}_{xX}\left(K_{XX} + \sum\nolimits_e\right)^{-1} y, \tag{18b}$$

for $\mathcal{T}$ and $\mathcal{V}$, respectively. The variances are computed as a)

$$\mathbb{V}[\mathcal{T}(x)] = k^{\mathcal{T}}(x, x) - K^{\mathcal{T}\tau}_{xX}\left(K_{XX} + \sum\nolimits_e\right)^{-1}\left(K^{\mathcal{T}\tau}_{xX}\right)^T, \tag{19a}$$

b)

$$\mathbb{V}[\mathcal{V}(x)] = k^{\mathcal{V}}(x, x) - K^{\mathcal{V}\tau}_{xX}\left(K_{XX} + \sum\nolimits_e\right)^{-1}\left(K^{\mathcal{V}\tau}_{xX}\right)^T, \tag{19b}$$

for $\mathcal{T}$ and $\mathcal{V}$, respectively.

From the posterior distributions of $\mathcal{T}$ and $\mathcal{V}$ given y an estimate of the energies at arbitrary input location $\tilde{x}$ may be obtained as $$\hat{\mathcal{T}}(\tilde{x}) = K^{\mathcal{T}\tau}_{\tilde{x}X}\left(K^{\tau}_{XX} + \sum\nolimits_e\right)^{-1} y, \tag{20a}$$

$$\hat{\mathcal{V}}(\tilde{x}) = K^{\mathcal{V}\tau}_{\tilde{x}X}\left(K^{\tau}_{XX} + \sum\nolimits_e\right)^{-1} y, \tag{20b}$$

where the covariance matrices $$K^{\mathcal{T}\tau}_{\tilde{x}X} \in \mathbb{R}^{1\times nN} \text{ and } K^{\mathcal{V}\tau}_{\tilde{x}X} \in \mathbb{R}^{1\times nN}$$

are obtained as $$K^{\mathcal{T}\tau}_{\tilde{x}X} = \left[k^{\mathcal{T}\tau}(\tilde{x}, x_1), \ldots , k^{\mathcal{T}\tau}(\tilde{x}, x_N)\right] \text{ and } K^{\mathcal{V}\tau}_{\tilde{x}X} = \left[k^{\mathcal{V}\tau}(\tilde{x}, x_1), \ldots , k^{\mathcal{V}\tau}(\tilde{x}, x_N)\right].$$

Referring to FIG. 5A, at 501 of the method 500A, the covariance between the kinetic energy $\mathcal{T}$ and the torques $\tau$ is computed as per eq. 17a above. At 503, a probabilistic posterior distribution of the kinetic energy is computed as per eq. 18a and 19a above. At block 505, the kinetic energy is estimated from the probabilistic posterior distribution of the kinetic energy based on the covariance between the kinetic energy $\mathcal{T}$ and the torques $\tau$, as $$E[\mathcal{T}(x) \mid \mathcal{D}] = K^{\mathcal{T}\tau}_{xX}\left(K_{XX} + \sum\nolimits_e\right)^{-1} y.$$

Referring to FIG. 5B, at 507 of the method 500B, the covariance between the potential energy $\mathcal{V}$ and the torques $\tau$ is computed as per eq. 17b above. At 509, a probabilistic posterior distribution of the potential energy is computed as per eq. 18b and 19b above. At block 511, the potential energy is estimated from the probabilistic posterior distribution of the kinetic energy based on the covariance between the kinetic energy $\mathcal{V}$ and the torques $\tau$, as $$E[\mathcal{V}(x) \mid \mathcal{D}] = K^{\mathcal{V}\tau}_{xX}\left(K_{XX} + \sum\nolimits_e\right)^{-1} y.$$

Torque Components

The energy-based control law in eq. (5) requires estimating m, c and g, while the LQR described previously requires the inverse of the inertia matrix M as well as the term ∂g/∂q. These quantities are derived similarly to how the energies are computed as described in the previous section.

First, the inertia matrix is estimated component wise. The element in position ij of M is $$M^{ij}(q) = \frac{\partial^2 \mathcal{T}(q, \dot{q})}{\partial \dot{q}^i \partial \dot{q}^j} =: \mathcal{G}_{M^{ij}} \mathcal{T}(\tilde{x}),$$

where we introduced the linear operator $\mathcal{G}_{M^{ij}}$. The covariance between $M^{ij}$ and τ at general input locations $\tilde{x}$ and $\tilde{x}'$ can be computed as $$\mathrm{Cov}[M^{ij}(x), \tau(\tilde{x}')] = \mathrm{Cov}[\mathcal{G}_{M^{ij}} \mathcal{T}(\tilde{x}), \mathcal{G}\mathcal{T}(\tilde{x}')] = \mathcal{G}_{M^{ij}} \mathcal{G} k^{\mathcal{T}}(\tilde{x}, \tilde{x}') =: k^{M^{ij}\tau}(\tilde{x}, \tilde{x}').$$

Accordingly, $M^{ij}$ may be estimated at any input location $\tilde{x}$ as $$M^{ij}(\tilde{x}) = K_{\tilde{x}X}^{M^{ij}\tau} \left(K_{XX}^{\tau} + \sum\nolimits_e\right)^{-1} y$$

with $$K_{\tilde{x}X}^{M^{ij}\tau} = \left[k^{M^{ij}\tau}(\tilde{x}, \tilde{x}_1), \ldots, k^{M^{ij}\tau}(\tilde{x}, \tilde{x}_N)\right].$$

Then, from the estimate of the inertia matrix an estimate of the inertial torque component may be derived as $\hat{m}(\tilde{x}) = \hat{M}(\tilde{x})\ddot{q}$.

Next, the gravity contribution g may be estimated. Recall that the i-th component of the vector g is defined as $$g^i(q) = \frac{\partial \mathcal{V}(q)}{\partial q^i}.$$

The covariance between $g^i$ and τ at general input locations $\tilde{x}$ and $\tilde{x}'$ is $$\mathrm{Cov}[g^i(x), \tau(\tilde{x}')] = \mathrm{Cov}\left[\frac{\partial \mathcal{V}(\tilde{x})}{\partial q^i}, \mathcal{G}\mathcal{V}(\tilde{x}')\right] = \frac{\partial \mathcal{G}' k^{\mathcal{V}}(\tilde{x}, \tilde{x}')}{\partial q^i} =: k^{g^i\tau}(\tilde{x}, \tilde{x}').$$

Accordingly $g^i$ can be estimated at any input location $\tilde{x}$ as $$\hat{g}(\tilde{x}) = K_{\tilde{x}X}^{g^i\tau}\left(\left(K_{XX}^{\tau} + \sum\nolimits_e\right)^{-1} y\right),$$

with $$K_{\tilde{x}X}^{g^i\tau} = \left[k^{g^i\tau}(\tilde{x}, \tilde{x}_1), \ldots, k^{g^i\tau}(\tilde{x}, \tilde{x}_N)\right].$$

Given the estimates of m and g, it is possible to obtain an estimate of the Coriolis and centripetal contribution c as $\hat{c}(\tilde{x}) = \hat{\tau}(\tilde{x}) - m(\tilde{x}) - g(\tilde{x})$.

Finally, the matrix $$\frac{\partial g}{\partial q} \in \mathbb{R}^{n \times n}$$

required in the computation of matrix A in eq. (12), is estimated following the same procedure adopted for the inertia matrix. Its element in position ij is given by.

$$\left[\frac{\partial g(q)}{\partial q}\right]_{ij} = \frac{\partial^2 \mathcal{V}(q)}{\partial q^i \partial q^j} =: \mathcal{G}_{G^{ij}} \mathcal{V}(q) =: G^{ij}(\tilde{x}).$$

Then, the covariance between $G^{ij}(\tilde{x})$ and the torque vector τ at general input locations $\tilde{x}$ and $\tilde{x}'$ is $$\mathrm{Cov}[G^{ij}(\tilde{x}), \tau(\tilde{x}')] = \mathrm{Cov}[\mathcal{G}_{G^{ij}} \mathcal{V}(q), \mathcal{G}\mathcal{V}(\tilde{x}')] = \mathcal{G}_{G^{ij}} \mathcal{G}' k^{\mathcal{V}}(\tilde{x}, \tilde{x}') =: k^{G^{ij}\tau}(\tilde{x}, \tilde{x}').$$

Finally, the estimate at a general input location $\tilde{x}$ is computed as $$\hat{G}^{ij}(\tilde{x}) = K_{\tilde{x}X}^{G^{ij}\tau}\left(K_{XX}^{\tau} + \sum\nolimits_e\right)^{-1} y,$$

with $$K_{\tilde{x}X}^{G^{ij}\tau} = \left[k^{G^{ij}\tau}(\tilde{x}, \tilde{x}_1), \ldots, k^{G^{ij}\tau}(\tilde{x}, \tilde{x}_N)\right].$$

Figure 6:
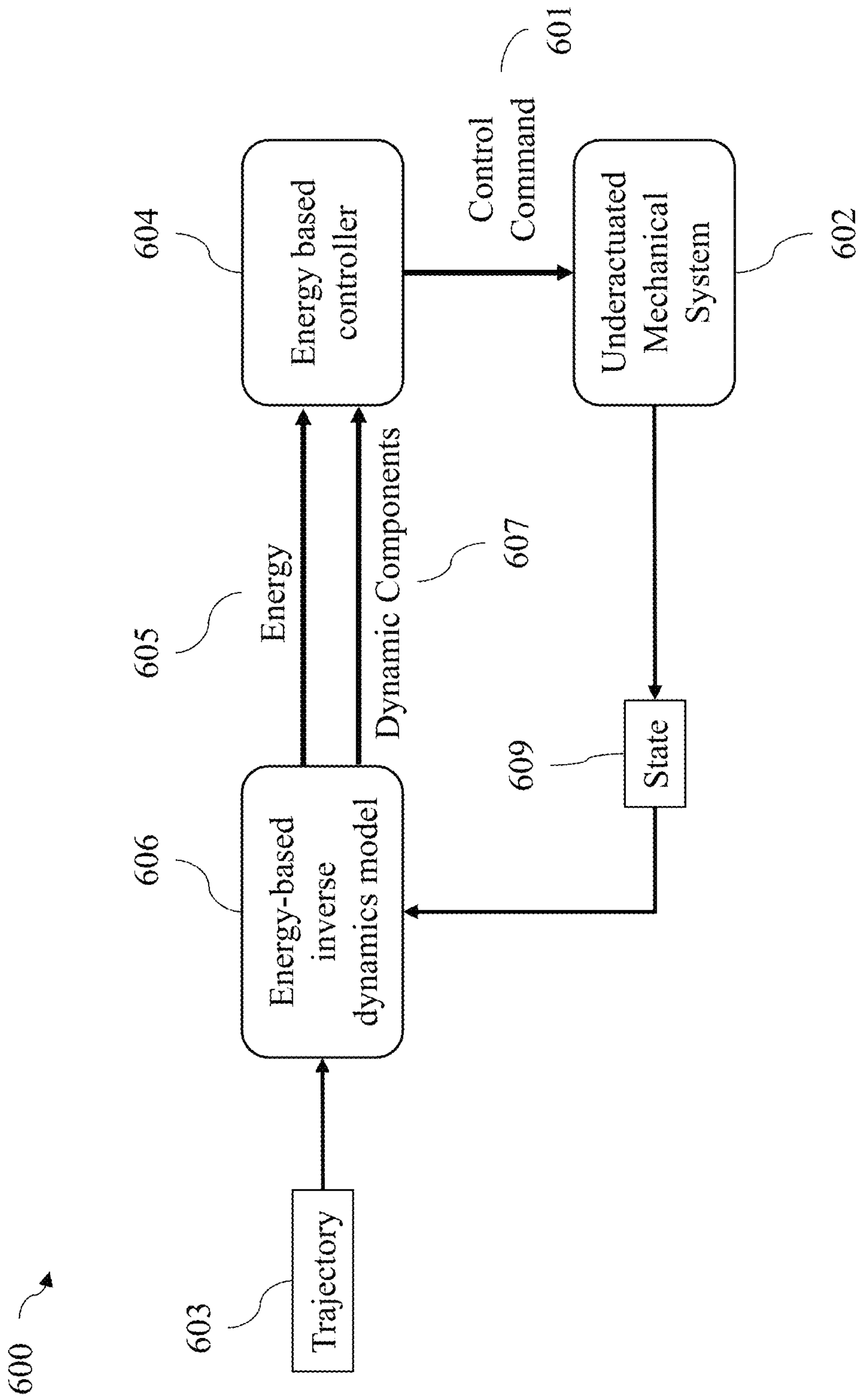
FIG. 6 illustrates a block diagram of a system for controlling an underactuated mechanical system, according to some embodiments.

FIG. 6 illustrates a block diagram of a system 600 for controlling an underactuated mechanical system 602, according to some embodiments. The system 600 comprises an energy-based controller 604 that generates control commands 601 to control the underactuated mechanical system 606 to track a trajectory 603. In this regard, the controller 604 interfaces with a trained energy-based inverse dynamics model 606 such as the model 107 of FIGS. 1A and 4. The model 606 takes the trajectory 603 and current states 609 as input to produce values of energies 605 and dynamic components 607 of the underactuated mechanical system 602. According to some embodiments, the model 606 outputs values of the kinetic and potential energies of the system 602 and one or more dynamic components such as the inertia, the inertial torques, Coriolis and centripetal torques, gravity contributions etc.

Some embodiments are based on the realization that the estimated kinetic energy and the potential energy can be used to detect anomaly of the underactuated mechanical system 602 during operation of the mechanical system 602 (e.g., while performing the task). The anomaly detection based on the estimated kinetic energy and the potential energy of the system 602 is explained next.

Figure 7:
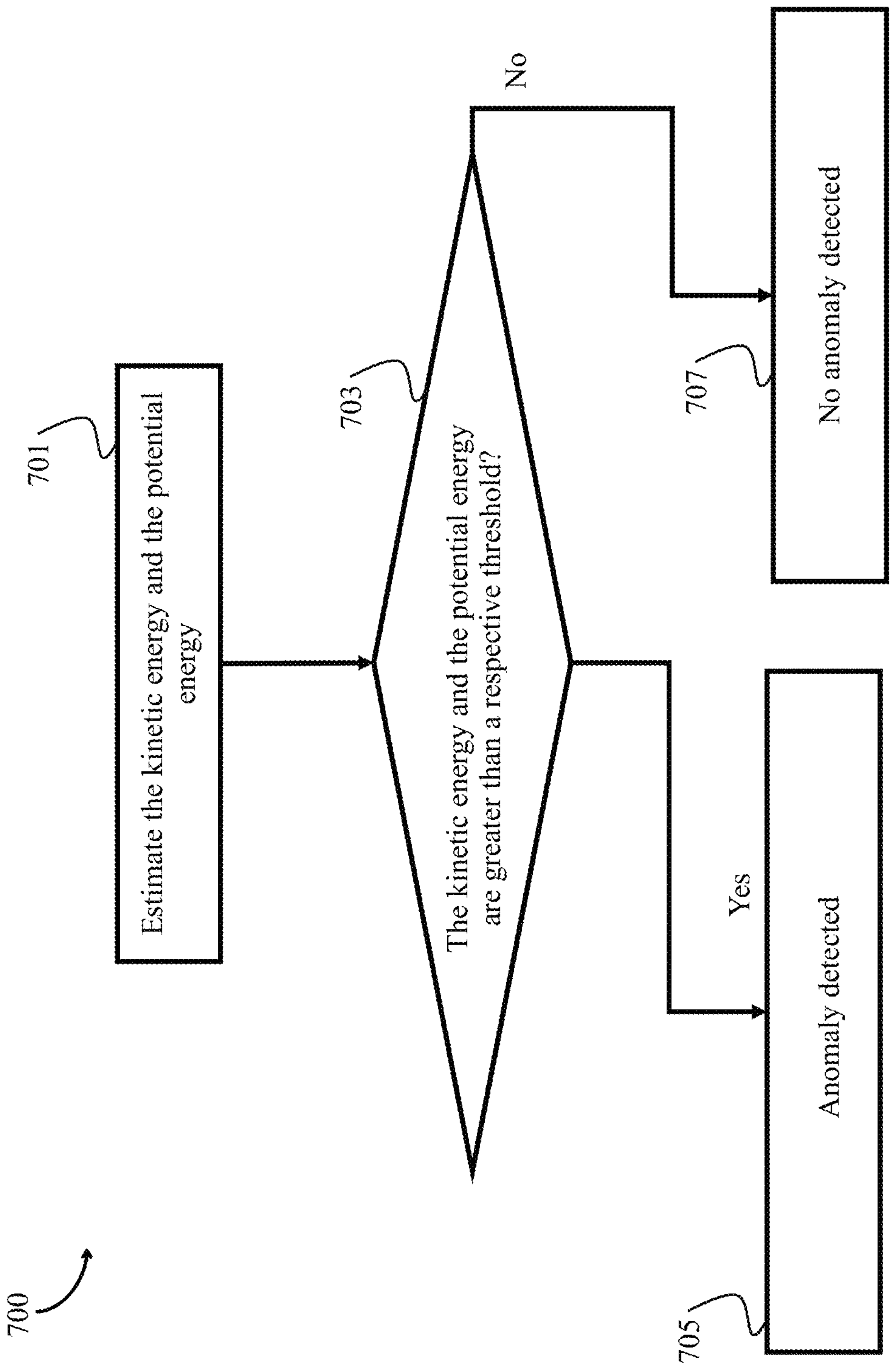
FIG. 7 illustrates a flow diagram of a method for anomaly detection based on the estimated kinetic energy and the potential energy of the underactuated mechanical system of FIG. 6, according to some embodiments.

FIG. 7 illustrates a flow diagram of a method 700 for an anomaly detection based on the estimated kinetic energy and the estimated potential energy of the underactuated mechanical system 602, according to some embodiments. At block 701, the kinetic energy and the potential energy of the underactuated mechanical system 602, are estimated for example in accordance with the framework described above with reference to FIG. 5A and FIG. 5B.

Further, the method 700 comprises comparing 703 the estimated kinetic energy and the estimated potential energy with a respective threshold. Towards this end, the estimated kinetic energy may be compared with a first threshold and the estimated potential energy may be compared with a second threshold. Based on such comparison, the anomaly is detected 705. For instance, at block 703, it may be checked if the estimated kinetic energy and the estimated potential energy are greater than the respective threshold. If the estimated kinetic energy and the estimated potential energy are greater than the first threshold and the second threshold, respectively, then, at block 705, it is inferred that the anomaly is detected. If the estimated kinetic energy and the estimated potential energy are not greater than the first threshold and the second threshold, respectively, then, at block 707, it is inferred that no anomaly is detected.

Alternatively, in some embodiments, it may be checked if the estimated kinetic energy and the estimated potential energy are less than the first threshold and the second threshold, respectively. If the estimated kinetic energy and the estimated potential energy are less than the first threshold and the second threshold, respectively, then it is inferred that the anomaly is detected. If the estimated kinetic energy and the estimated potential energy are not less than the first threshold and the second threshold, respectively, then it is inferred that no anomaly is detected. If the estimated kinetic energy is greater than the first threshold and the estimated potential energy is less than the second threshold, then a fault detection is inferred as a special case of anomaly detection depending only on potential energy faults. If the estimated potential energy is greater than the second threshold and the estimated kinetic energy is less than the first threshold, then a fault detection is inferred as a special case of anomaly detection depending only on kinetic energy faults.

Additionally, in some embodiments, the estimated potential energy and the estimated kinetic energy may be used to adjust the control commands for the underactuated mechanical system 602. For instance, based on the estimated potential energy and the estimated kinetic energy, a passivity controller may be designed to control the underactuated mechanical system 602. The passivity controllers are effective to control mechanical systems but require precise models of the energies to define Hamiltonian or Lagrangian of the system. Some embodiments can estimate accurate models of the energies that result in accurate passivity controllers.

Additionally, in an embodiment, a processor may be configured to determine, based on the estimated kinetic energy and the estimated potential energy, a motion plan that consumes a minimum amount of energy for performing the task. The motion plan may include a trajectory for performing the task. Such an embodiment is described below in FIG. 8.

Figure 8:
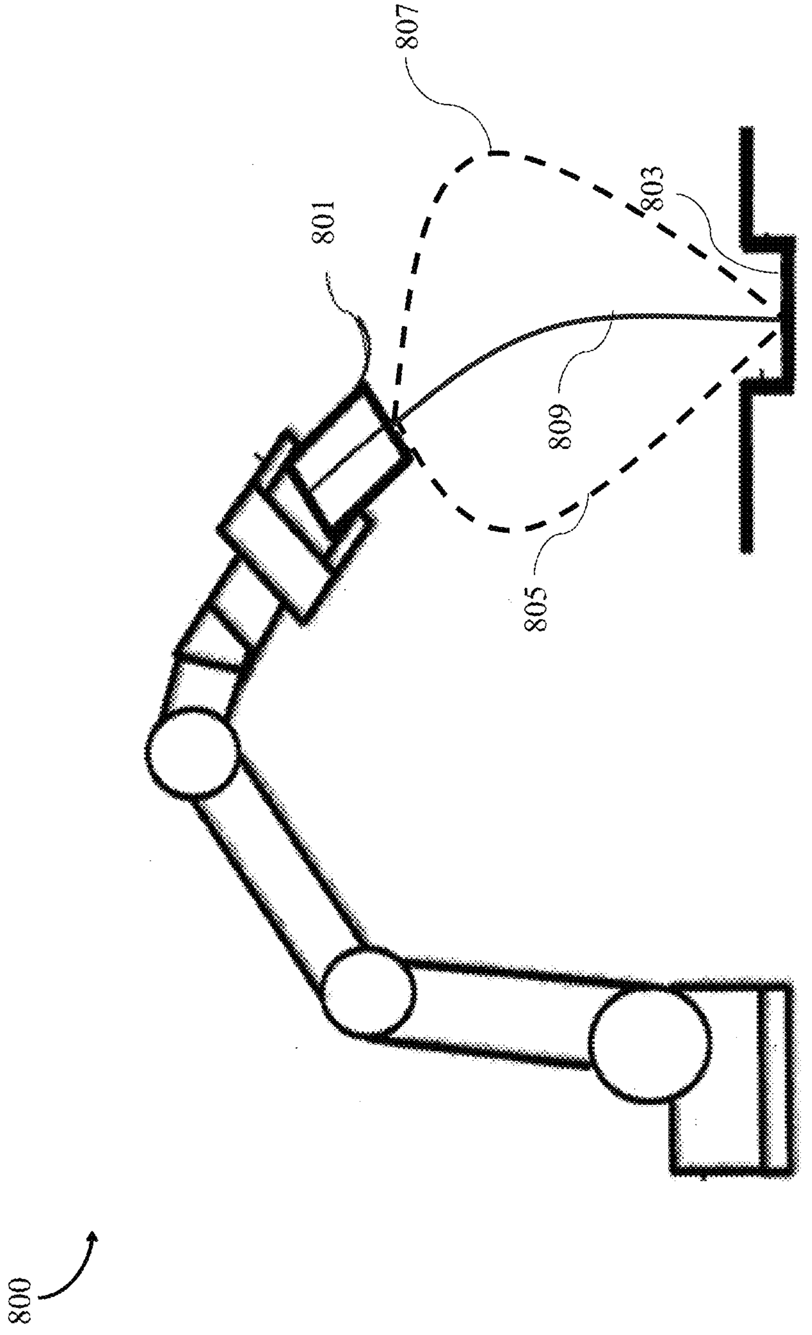
FIG. 8 illustrates a framework for generating a motion plan that consumes a minimum amount of energy for performing a task, according to some embodiments.

FIG. 8 illustrates a motion plan 809 that consumes a minimum amount of energy for performing the task by the robotic manipulator 800, according to some embodiments. The motion plan 809 is a trajectory to be tracked by the robotic manipulator 800 for performing the task. It is an object of some embodiments to configure the robotic manipulator 800 to perform a task of inserting an object 801 in a hole 803. A motion plan may be determined for the robotic manipulator 800 to perform the task. Different motion plans, such as a motion plan 805 and a motion plan 807, may be determined for performing the task. However, it is desired to determine a motion plan that consumes the minimum amount of energy for performing the task. The processor 103 is configured to determine, based on the estimated kinetic energy and the estimated potential energy, the motion plan 809 that consumes the minimum amount of energy for performing the task. Further, the processor 103 is configured to control the robotic manipulator 800 according to the motion plan 809 to perform the task by consuming the minimum amount of energy. For example, based on the motion plan 809, the processor 103 is configured to determine control commands for the different actuators of the robotic manipulator 800. The control commands are applied to the different actuators of the robotic manipulator 800. The control commands cause the robotic manipulator 800 to track the motion plan 809 for performing the task.

Figure 9:
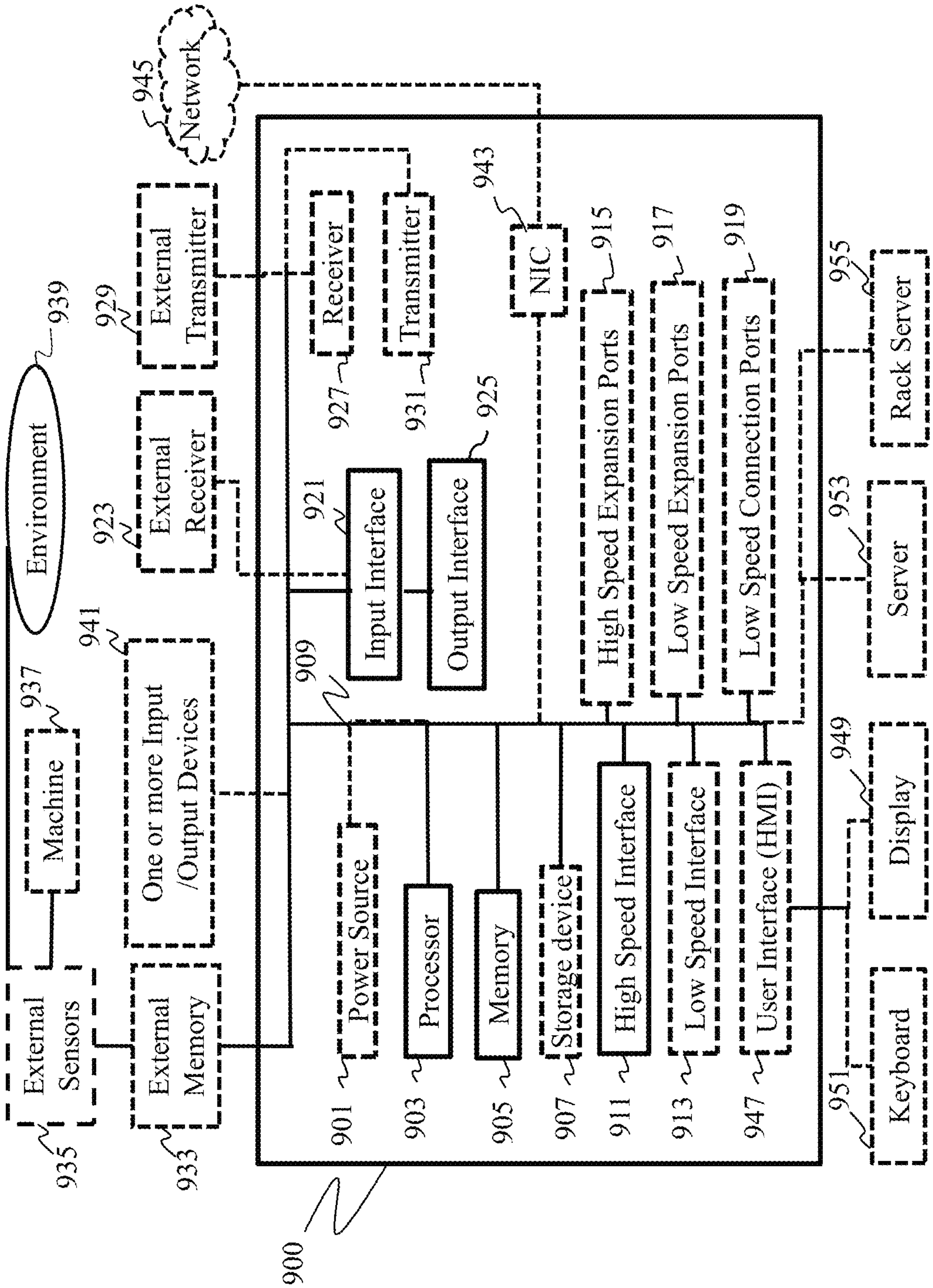
FIG. 9 is a schematic illustrating a computing device for implementing various hardware components, according to some embodiments.

FIG. 9 is a schematic illustrating a computing device 900 for implementing the controller 101 and methods of the present disclosure. The computing device 900 includes a power source 901, a processor 903, a memory 905, a storage device 907, all connected to a bus 909. Further, a high-speed interface 911, a low-speed interface 913, high-speed expansion ports 915 and low speed connection ports 917, can be connected to the bus 909. In addition, a low-speed expansion port 919 is in connection with the bus 909. Further, an input interface 921 can be connected via the bus 909 to an external receiver 923 and an output interface 925. A receiver 927 can be connected to an external transmitter 929 and a transmitter 931 via the bus 909. Also connected to the bus 909 can be an external memory 933, external sensors 935, machine(s) 937, and an environment 939. Further, one or more external input/output devices 941 can be connected to the bus 909. A network interface controller (NIC) 943 can be adapted to connect through the bus 909 to a network 945, wherein data or other data, among other things, can be rendered on a third-party display device, third party imaging device, and/or third-party printing device outside of the computer device 900.

The memory 905 can store instructions that are executable by the computer device 900 and any data that can be utilized by the methods and systems of the present disclosure. The memory 905 can include random access memory (RAM), read only memory (ROM), flash memory, or any other suitable memory systems. The memory 905 can be a volatile memory unit or units, and/or a non-volatile memory unit or units. The memory 905 may also be another form of computer-readable medium, such as a magnetic or optical disk.

The storage device 907 can be adapted to store supplementary data and/or software modules used by the computer device 900. The storage device 907 can include a hard drive, an optical drive, a thumb-drive, an array of drives, or any combinations thereof. Further, the storage device 907 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 903), perform one or more methods, such as those described above.

The computing device 900 can be linked through the bus 909, optionally, to a display interface or user Interface (HMI) 947 adapted to connect the computing device 900 to a display device 949 and a keyboard 951, wherein the display device 949 can include a computer monitor, camera, television, projector, or mobile device, among others. In some implementations, the computer device 900 may include a printer interface to connect to a printing device, wherein the printing device can include a liquid inkjet printer, solid ink printer, large-scale commercial printer, thermal printer, UV printer, or dye-sublimation printer, among others.

The high-speed interface 911 manages bandwidth-intensive operations for the computing device 900, while the low-speed interface 913 manages lower bandwidth-intensive operations. Such an allocation of functions is only an example. In some implementations, the high-speed interface 911 can be coupled to the memory 905, the user interface (HMI) 947, and to the keyboard 951 and the display 949 (e.g., through a graphics processor or accelerator), and to the high-speed expansion ports 915, which may accept various expansion cards via the bus 909. In an implementation, the low-speed interface 913 is coupled to the storage device 907 and the low-speed expansion ports 917, via the bus 909. The low-speed expansion ports 917, which may include various communication ports (e.g., USB, Bluetooth, Ethernet, wireless Ethernet) may be coupled to the one or more input/output devices 941. The computing device 900 may be connected to a server 953 and a rack server 955. The computing device 900 may be implemented in several different forms. For example, the computing device 900 may be implemented as part of the rack server 955.

In accordance with several embodiments, the controller 101 is configured to control the mechanical system 109 using the inverse dynamics model 107. The inverse dynamics model 107 models the energy of the mechanical system 109. Modeling the energy captures mutual effects of the torques of the different actuators on each other. Thereby, the inverse dynamics model 107 enables accurate controlling of the mechanical system 101. Additionally, the formulation of the inverse dynamics model 107 requires minimum physical information about the mechanical system 109. To that end, the formulation of the inverse dynamics model 107 is computationally inexpensive. Additionally, or alternatively, the inverse dynamics model 107 can be used to estimate the kinetic energy of the mechanical system 109 and the potential energy of the mechanical system 109.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks. Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

What is claimed is:

1. A feedback controller for controlling a mechanical system, the mechanical system having multiple degrees of freedom and comprising a plurality of actuators and a plurality of joints, the feedback controller comprising:

a memory configured to store an energy-based inverse dynamics model trained with machine learning to map dynamic states of the mechanical system to corresponding torques for the plurality of actuators, wherein the energy-based inverse dynamics model is configured to model potential and kinetic energy of the mechanical system as Gaussian Processes of the dynamic states and derive Gaussian Processes for the torques from the Gaussian Processes of the dynamic states based on physics of relationship between the torques and the potential and kinetic energy of the mechanical system; and a processor configured to:

collect a feedback signal of an operation of the mechanical system, the feedback signal including current states of dynamics of the mechanical system indicative of a position, a velocity, and an acceleration of each joint of the plurality of joints of the mechanical system;

process the current states of dynamics with the energy-based inverse dynamics model to produce values of the torques for the plurality of actuators and values of the potential and kinetic energy of the mechanical system; and control the mechanical system based on the produced values of the torques for the plurality of actuators of the mechanical system and the values of the potential and kinetic energy of the mechanical system.

2. The feedback controller of claim 1, wherein the energy-based inverse dynamics model is configured to model the potential energy and the kinetic energy of the mechanical system as independent Gaussian Processes of the dynamic states of the mechanical system, wherein each of the Gaussian Processes for the potential energy and the kinetic energy of the mechanical system is defined based on a different kernel function, and wherein the kernel function for the potential energy of the mechanical system combined with a physics based first operator define a covariance of the potential energy of the mechanical system with respect to the torques of the actuators and the kernel function for the kinetic energy of the mechanical system combined with a physics based second operator define a covariance of the kinetic energy of the mechanical system with respect to the torques of the actuators.

3. The feedback controller of claim 2, wherein the physics based first operator and the physics based second operator are given by a respective set of linear differential equations that relate a Lagrangian function of the mechanical system to the torques accordingly to first principles.

4. The feedback controller of claim 1, wherein each of the Gaussian Processes for the potential energy and kinetic energy of the mechanical system is a zero-mean Gaussian Process.

5. The feedback controller of claim 1, wherein the mechanical system is configured to perform a task or track a reference trajectory for performing the task, wherein the reference trajectory defines positions of joints of the mechanical system as a function of time, and wherein the processor is further configured to:

produce values of the potential energy of the mechanical system at each position of each joint of the plurality of joints as a first function of a covariance between the potential energy of the mechanical system and the produced value of torque of a corresponding actuator of the plurality of actuators of the mechanical system at respective positions of the reference trajectory; and produce values of the kinetic energy of the mechanical system at each position of each joint of the plurality of joints as a second function of a covariance between the kinetic energy and the produced value of torque of a corresponding actuator of the plurality of actuators of the mechanical system at respective positions of the reference trajectory.

6. The feedback controller of claim 1, wherein the Gaussian Processes of the torques has a covariance matrix capturing correlations between the torques of the plurality of actuators, and wherein the covariance matrix is a full matrix including non-zero elements.

7. The feedback controller of claim 1, wherein to control the mechanical system, the processor is configured to:

compute separately an inertia matrix, an inertial torque component and one or more remaining torque components of the mechanical system from the estimated kinetic and potential energy of the mechanical system; and determine control commands to the actuators of the mechanical system based on the produced values of the torques and the inertia matrix, the inertial torque component and the one or more remaining torque components of the mechanical system.

8. The feedback controller of claim 7, wherein the inertia matrix, the inertial torque component and the one or more remaining torque components of the mechanical system are composed in a classical feedback linearization controller.

9. The feedback controller of claim 1, wherein the mechanical system is underactuated having more degrees of freedom than a number of the plurality of actuators, and wherein to control the mechanical system, the processor is configured to:

compute an inertia matrix, an inertial torque component, a Coriolis torque component, a gravitational torque component, a derivative of the gravitational torque component with respect to the joint positions, a feedback linearizing controller offset, and matrices of a linear quadratic regulator of the mechanical system from the estimated kinetic and potential energy of the mechanical system; and determine control commands to the actuators of the mechanical system based on the produced values of the torques and one or more of the inertia matrix, the inertial torque component, the Coriolis torque component, the gravitational torque component, the derivative of the gravitational torque component with respect to the joint positions, the feedback linearizing controller offset, and the matrices of the linear quadratic regulator of the mechanical system.

10. The feedback controller of claim 1, wherein the Gaussian Process for the torques is trained using supervised learning, wherein the torque measurements and the dynamic states measurements are measured with one more sensors during training phase.

11. The feedback controller of claim 10, wherein the sensors comprise one or more of an encoder, a camera, a laser, a velocimeter, an accelerometer, an inertia measurement unit to measure the dynamic state and a force torque sensor, a string gauge, or a torque sensor.

12. The feedback controller of claim 11, wherein the training of the Gaussian Processes utilizes random movements of the mechanical system, or an ad-hoc trajectory.

13. The feedback controller of claim 1, wherein the energy based inverse dynamics model is defined by a Lagrangian polynomial kernel that is based on a Lagrangian operator mapping a Lagrangian function of the mechanical system to the torques of the plurality of actuators.

14. The feedback controller of claim 13, wherein the Lagrangian function is defined based on a difference between the kinetic energy of the mechanical system and the potential energy of the mechanical system.

15. The feedback controller of claim 13, wherein one or more hyperparameters of the Lagrangian polynomial kernel are learned based on a machine learning algorithm, the machine learning algorithm using maximization of marginal likelihood.

16. The feedback controller of claim 1, wherein the processor is further configured to detect an anomaly of the mechanical system based on a comparison of the produced values of kinetic energy with a first threshold and the produced values of potential energy with a second threshold.

17. The feedback controller of claim 1, wherein the processor is further configured to determine a motion plan that consumes a minimum amount of energy for performing the task, based on the produced values of kinetic energy and the produced values of potential energy.

18. A computer-implemented method for controlling a mechanical system, the mechanical system having multiple degrees of freedom and comprising a plurality of actuators, the method comprising:

accessing a memory to retrieve an energy-based inverse dynamics model trained with machine learning to map dynamic states of the mechanical system to corresponding torques for the plurality of actuators, wherein the energy-based inverse dynamics model is configured to model potential and kinetic energy of the mechanical system as Gaussian Processes of the dynamic states and derive Gaussian Processes for the torques from the Gaussian Processes of the dynamic states of the mechanical system based on physics of relationship between the torques and the potential and kinetic energy of the mechanical system;

collecting a feedback signal of an operation of the mechanical system, the feedback signal including current states of dynamics of the mechanical system indicative of a position, a velocity, and an acceleration of each joint of the plurality of joints of the mechanical system;

processing the current states of dynamics with the energy-based inverse dynamics model to produce values of the torques for the plurality of actuators and values of the potential and kinetic energy of the mechanical system; and controlling the mechanical system based on the produced values of the torques for the plurality of actuators of the mechanical system and the values of the potential and kinetic energy of the mechanical system.

* * * * *